United States Patent
Sharifi et al.

(10) Patent No.: US 9,756,005 B2
(45) Date of Patent: Sep. 5, 2017

(54) NOTIFICATION BUNDLES FOR AFFINITIES BETWEEN NOTIFICATION DATA

(71) Applicant: Google Inc., Mountain View, CA (US)

(72) Inventors: Matthew Sharifi, Zurich (CH); Jakob Nicolaus Foerster, Zurich (CH)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/932,915

(22) Filed: Nov. 4, 2015

(65) Prior Publication Data

US 2017/0126609 A1    May 4, 2017

(51) Int. Cl.
*G08B 23/00* (2006.01)
*H04L 12/58* (2006.01)
*G08B 5/22* (2006.01)

(52) U.S. Cl.
CPC .............. *H04L 51/24* (2013.01); *G08B 5/222* (2013.01)

(58) Field of Classification Search
CPC ......... H04W 4/00; H04W 4/003; H04W 4/20; H04L 51/24; H04L 12/1895; H04L 12/587; G08B 5/222
USPC .................. 340/501, 539.1; 709/206, 207
See application file for complete search history.

(56) References Cited

U.S. PATENT DOCUMENTS

| | | | |
|---|---|---|---|
| 7,571,474 B2 * | 8/2009 | Ross | G06F 21/554 726/22 |
| 8,015,152 B2 * | 9/2011 | Ozhan | G06Q 10/107 709/203 |
| 2010/0056112 A1 * | 3/2010 | Dupont | H04L 12/587 340/539.11 |
| 2010/0169434 A1 | 7/2010 | Lind et al. | |
| 2012/0117507 A1 * | 5/2012 | Tseng | G06F 3/0488 715/774 |
| 2012/0215771 A1 | 8/2012 | Steiner | |
| 2012/0245887 A1 | 9/2012 | Spears et al. | |

(Continued)

FOREIGN PATENT DOCUMENTS

CN    103559022 A    2/2014

OTHER PUBLICATIONS

Android Developers, "Stacking Notifications," retrieved from http://developer.android.com/training/wearables/notifications/stacks.html, Sep. 29, 2015, 4 pp.

(Continued)

*Primary Examiner* — Thomas Mullen
(74) *Attorney, Agent, or Firm* — Shumaker & Sieffert, P.A.

(57) ABSTRACT

In some examples, a method includes receiving, first notification data from a first application and second notification data from a second application. The method may include generating, based at least in part on comparing the first notification data to the second notification data, an affinity score that indicates whether content from the first notification data has a relationship to at least a portion of content from the second notification data. The method may include, generating a bundle notification graphical element that includes at least a portion of the content from the first notification data and a graphical indicator that indicates the content from the first and second notification data are related. The method may include outputting a set of notification graphical elements comprising the bundle notification graphical element accompanied by the graphical indicator.

21 Claims, 6 Drawing Sheets

(56) References Cited

U.S. PATENT DOCUMENTS

2013/0054706 A1* 2/2013 Graham ............... H04M 19/04
  709/206
2013/0297608 A1 11/2013 Etoh et al.
2013/0325922 A1 12/2013 Chaudhri et al.

OTHER PUBLICATIONS

Ardissono et al., "Context-Aware Notification Management in an Integrated Collaborative Environment," retrieved from http://www.di.unito.it/~goy/papers/umap_ws09.pdf, University di Torino, Italy, Jun. 26, 2009, 10 pp.
International Search Report and Written Opinion of International Application No. PCT/US2016/058697, mailed Feb. 6, 2017, 13 pp.

* cited by examiner

NOTIFICATION BUNDLES FOR AFFINITIES BETWEEN NOTIFICATION DATA

BACKGROUND

Computing devices can perform various functions, such as executing applications stored at the computing device and outputting information for display (e.g., on a screen of the computing device). For instance, computing devices may execute a variety of applications, such as an email client, travel assistant, messaging client, and the like. To assist a user, a computing device may provide alerts for events, such the arrival of new email, an upcoming flight, or an incoming text message. The computing device may provide these alerts through a variety of forms, such as haptic feedback, sound, and visual notifications. However, ever-increasing numbers of applications and information received at the computing device may result in larger numbers of alerts. As the number of alerts increases, the user may exert more effort to evaluate the alerts and either dismiss alerts or act upon them. As the number of alerts and level of effort to address such alerts increases, the usefulness of the alerts may diminish.

DETAILED DESCRIPTION

In general, techniques of the present disclosure are directed to detecting a relationship between content of different notifications from different applications and outputting a bundle notification graphical element that represents the set of different, but related notifications. For instance, two different applications executing at a computing device may each generate a separate notification. Each of the two notifications may include duplicate content. For example, an email client and travel application may both generate separate notifications that include the same flight details. As such, the content of one notification may be duplicative of the other. Rather than displaying separate notification graphical elements for each of the respective notifications, techniques of the disclosure may compare the content of the notifications to generate an affinity score that indicates whether a relationship exists between content of the notifications. If the affinity score satisfies a threshold, the computing device may output a bundle notification graphical element representing both of the notifications that have related content. In this way, the computing device may output a single bundle notification graphical element representing multiple notifications that are each related based on content included in the respective notifications. Since the bundle notification graphical element may consume less screen real estate than displaying two separate singular notification graphical elements, techniques of the disclosure may improve the overall use and allocation of screen real estate of a display device. In some instances, the techniques may also reduce the amount of effort needed by a user to evaluate and act upon notification graphical elements because fewer notification graphical elements may be output for display.

Figure 1:
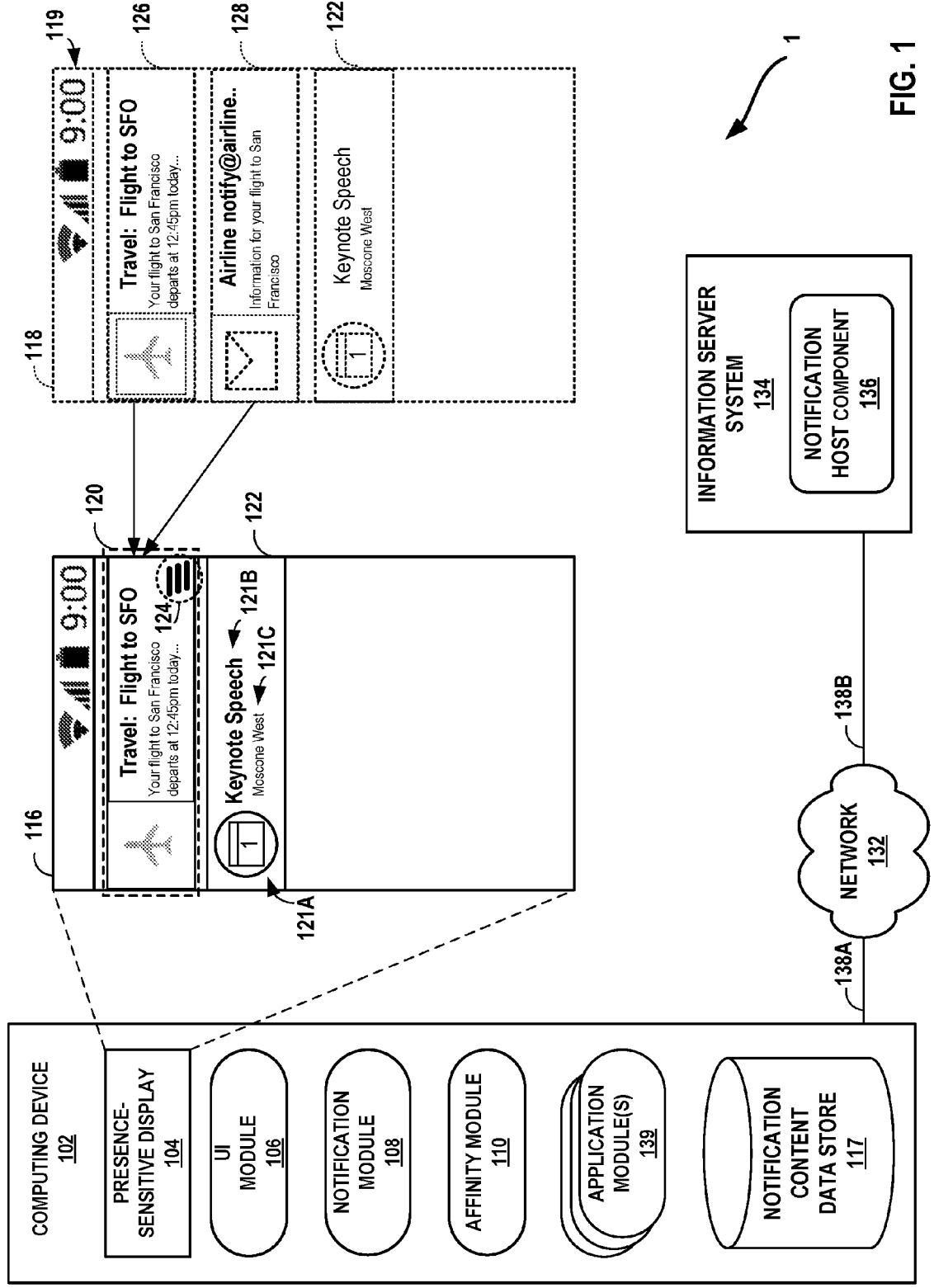
FIG. 1 is a conceptual diagram illustrating an example computing system configured to identify relationships between different instances of notification data, and output a bundle notification graphical element for a bundle of related notifications, in accordance with techniques of this disclosure.

FIG. 1 is a conceptual diagram illustrating an example computing system 1 configured to identify relationships between different instances of notification data, and output a bundle notification graphical element for a bundle of related notifications, in accordance with techniques of this disclosure. As shown in FIG. 1, network 132 represents any public or private communication network, for instance, a cellular, Wi-Fi, and/or other type of network for transmitting data between computing devices. Computing device 102 and information server system 134 may send and receive data across network 132 using any suitable communication techniques. For example, computing device 102 may be operatively coupled to network 132 using network link 138A. Information server system 134 may be operatively coupled to network 132 by network link 138B. Network 132 may include network hubs, network switches, network routers, etc., that are operatively inter-coupled thereby providing for the exchange of information between computing device 102 and information server system 134. In some examples, network links 138A and 138B may be Ethernet, ATM or other network connections. Such connections may be wireless and/or wired connections.

Information server system 134 represents any suitable remote computing system, such as one or more desktop computers, laptop computers, mainframes, servers, cloud computing systems, etc. capable of sending and receiving information across network link 138B to network 132. In some examples, information server system represents a host server for a notification system service. One or more computing devices, such as computing device 102, may access a notification service hosted by information server system 134 for transmitting and/or receiving notification data between platforms, applications, and services executing at the one or more computing devices. In some examples, information server system 134 represents a cloud computing system that provides notification services through network 132 to one or more computing devices, such as computing device 102, that access the notification services via access to the cloud provided by information server system 134.

In the example of FIG. 1, information server system 134 includes notification host component 136. Notification host component 136 may perform operations described using software, hardware, firmware, or a mixture of hardware, software, and firmware residing in and/or executing at information server system 134. Information server system 134 may execute notification host component 136 with multiple processors or multiple devices. Information server system 134 may execute notification host component 136 as a virtual machine executing on underlying hardware. Notification host component 136 may execute as part of a framework or as a service of an operating system. For instance, notification host component 136 may be included as an operating system component that executes with elevated execution privileges of the operating system. The elevated execution privileges may be greater than userspace privileges granted to applications not operating with elevated execution privileges. Notification host component 136 may execute as one or more executable programs at an application layer of a computing platform.

Notification host component 136 may perform functions for routing notification data between one or more computing devices, such as computing device 102, over network 132. For example, notification host component 136 may perform functions for hosting a notification service and outputting notification data associated with platforms, applications, and/or services executing at computing device 102. For example, notification host component 136 may receive notification data indicative of an event associated with an e-mail message account (e.g., a new message received) associated with computing device 102 and send the notification data across network 132 to computing device 102. Computing device 102 may receive the notification data from notification host component 136 of information server system 134 via network link 138B. Other functions that may be performed by a notification host component include, but are not limited to providing: weather information, sports information, social networking information, financial or stock market information, emergency information, travel information, messaging information, and calendar information, to name only a few examples.

In FIG. 1, computing device 102 may be associated with a user that interacts with the computing device by providing various user inputs into the computing device. Examples of computing device 102 may include, but are not limited to, portable or mobile devices such as mobile phones (including smart phones), laptop computers, tablet computers, wearable computing devices such as smart watches or computerized eyewear, smart television platforms, cameras, personal digital assistants (PDAs), etc. In some examples, computing device 102 may include stationary computing devices such as desktop computers, servers, mainframes, etc. Computing device 102, in some examples, may include presence-sensitive display 104, UI module 106, notification module 108, affinity module 110, and application components 139. Other examples of computing device 102 that implement techniques of this disclosure may include additional components not shown in FIG. 1.

In some examples, computing device 102 may include a presence-sensitive display 104. Presence-sensitive display 104 of computing device 102 may function as an input device for computing device 102 and as an output device. Presence-sensitive display 104 may be implemented using various technologies. For instance, presence-sensitive display 104 may function as an input device using a presence-sensitive input component, such as a resistive touchscreen, a surface acoustic wave touchscreen, a capacitive touchscreen, a projective capacitance touchscreen, a pressure-sensitive screen, an acoustic pulse recognition touchscreen, or another presence-sensitive display technology. Presence-sensitive display 104 may function as an output (e.g., display) device using any one or more display components, such as a liquid crystal display (LCD), dot matrix display, light emitting diode (LED) display, organic light-emitting diode (OLED) display, e-ink, or similar monochrome or color display capable of outputting visible information to a user of computing device 102.

Computing device 102 may include application modules 139, UI module 106, notification module 108, and affinity module 110. Modules 106, 108, 110, and 139 may perform operations described herein using software, hardware, firmware, or a mixture of both hardware, software, and firmware residing in and executing on computing device 100 or at one or more other remote computing devices. Computing device 102 may execute modules 106, 108, 110, and 139 with one or more processors. Computing device 102 may execute any of modules 106, 108, 110, and 139 as or within a virtual machine executing on underlying hardware. Modules 106, 108, 110, and 139 may be implemented in various ways. For example, any of modules 106, 108, 110, and 139 may be implemented as a downloadable or pre-installed application or "app." In another example, any of modules 106, 108, 110, and 139 may be implemented as part of an operating system of computing device 102.

Computing device 100 may also include UI module 106. UI module 106 of computing device 102 may receive from presence-sensitive display 104, one or more indications of user input detected at presence-sensitive display 104. Generally, each time presence-sensitive display 104 receives an indication of user input detected at a particular location of presence-sensitive display 104, UI module 106 may receive information about the user input from presence-sensitive display 104. UI module 106 may assemble the information received from presence-sensitive display 104 into a set of events, which may be time-ordered, that are indicative of a gesture, such as a sequence of one or more touch events. Each touch event in the sequence may include data or components that represents parameters (e.g., when, where, originating direction) characterizing a presence and/or movement of input at the presence-sensitive screen. Each touch event in the sequence may include a location component corresponding to a location of presence-sensitive display 104, a time component related to when presence-sensitive display 104 detected user input at the location, and/or an action component related to whether the touch event corresponds to a lift up or a push down at the location.

UI module 106 may determine one or more characteristics of the user input based on the sequence of touch events and include information about these one or more characteristics within each touch event in the sequence of touch events. For example, UI module 106 may determine a start location of the user input, an end location of the user input, a density of a portion of the user input, a speed of a portion of the user input, a direction of a portion of the user input, or a curvature of a portion of the user input, to name only a few examples. One or more touch events in the sequence of touch events may include (in addition to a time, a location, and an action component as described above) a characteristic component that includes information about one or more characteristics of the user input (e.g., a density, a speed, etc.). UI module 106 may transmit, as output to other modules and/or components, the sequence of touch events including the components or parameterized data associated with each touch event. UI module 106 may act as an intermediary between various components and modules of computing device 100 to process and send input detected by presence-sensitive display 104 to other components and modules, and generate output from other components and modules that is presented by presence-sensitive display 104.

As shown in FIG. 1, computing device 102 includes one or more application modules 139. Application modules 139 may include functionality to perform any variety of operations on computing device 102. For instance, application modules 139 may include an email application, text messaging application, instant messaging application, weather application, video conferencing application, social networking application, stock market application, emergency alert application, sports application, office productivity application, multimedia player, etc. Although shown as operable by computing device 102, one or more of application modules 139 may be operable by a remote computing device that is communicatively coupled to computing device 102. In such examples, an application module executing at a remote computing device may cause the remote computing device to send information using any suitable form of data communication (e.g., wired or wireless network, short-range wireless communication such as Near Field Communication or Bluetooth, etc.). In some examples, a remote computing device may be a computing device that is separate from computing device 102. For instance, the remote computing device may be operatively coupled to computing device 102 by a network. Examples of a remote computing device may include, but are not limited to a server, smartphone, tablet computing device, smart watch, and desktop computer. In some examples, a remote computing device may not be an integrated component of computing device 102.

Computing device 102 may include notification module 108. Notification module 108 may perform operations associated with receiving, generating, displaying, and/or otherwise handling a notification data. In some examples, application modules 139 may send the notification data to notification module 108 via one or more Application Programming Interfaces (APIs) that are provided by notification module 108 and invoked by application modules 139. In some examples, a notification may be a message that is generated synchronously or asynchronously by an application and may include notification data. A computing device may display a notification by outputting a notification graphical element that includes one or more portions of notification data, such as content of the notification data. Notification data may be implemented, stored, and/or structured in variables, objects, and/or data structures. In object-oriented programming, an object may refer to a particular instance of a class. In such examples, an object may include attributes and methods. The attributes and methods of an object that represents notification data may correspond to and/or control the appearance and content of a notification graphical element. For instance, as further described in this disclosure, a notification graphical element may include a title and a body that are each output for display in a graphical user interface. The content of the title and the body may each be stored in attributes of an object that represents notification data, and the attributes may be updated using methods of the object.

In the example of FIG. 1, notification data is implemented as an object that includes or otherwise references content, such as but not limited to: text, pictures, videos, audio, and metadata. For instance, an email client of application modules 139 may receive email content from notification host component 136, wherein the content includes a sender address, recipient address, subject line text, and email body text. The email content may include metadata, such the content of the email message header. The email client may generate notification data corresponding to the email by instantiating an object with various attributes and methods. Upon instantiating the object, the email client may set one or more attributes of the object using one or more methods of the object. For instance, the email client may set the title attribute in the object representing the notification data to the sender's address. The email client may set other attributes of the object representing the notification data, as well. The email client may invoke an API of notification module 108 to send the object representing the notification data to notification module 108.

Notification module 108 may receive the object representing the notification data from the email client. Upon receiving the object, notification module 108 may cause UI module 106 to output one or more alerts (e.g., an audible alert, a visual alert (e.g., notification graphical element), a vibration, etc.) to indicate the receipt of the notification data by notification module 108. The alerts outputted by UI module 106 may include content included in and/or referenced by the object that represents the notification data. To output content of notification data for display, notification module 108 may generate a notification graphical element for display, which may be rendered in a graphical user interface. As an example, notification module 108 may generate singular notification graphical element 122 that is output for display in graphical user interface 116. Notification module 108 may select content from an object representing notification data, such as an image, title, and body. Notification module 108 may set image 121A, title 121B, and body 121C of singular notification graphical element 122 based on the content selected from the object representing the notification data. Notification module 108 may send data representing notification graphical element 122 to UI module 106, and UI module 106 may cause presence-sensitive display 104 to output the notification graphical element for display.

Although the foregoing example was described with respect to an email client receiving email content remotely from information server 134, in other examples, an application may generate notification locally without receiving content from a remote server. For instance, a clock application of application modules 139 may generate an alarm notification based on an alarm set by the user. When clock application determines that the alarm condition is satisfied, the clock application may instantiate an object representing notification data for the alarm, and send the object to notification module 108 in the same way as described above with respect to the email notification. Notification module 108 may receive such objects from one or more of application modules 139 as the objects are generated and sent by application modules 139. In some examples, notification module 108 may receive notification data from applications stored and/or executing at computing devices other than computing device 102.

In the example of FIG. 1, application modules 139 may generate respective instances of notification data, such as objects, that the application modules send to notification module 108. Notification module 108 may, as described above, generate notification graphical elements 126, 128, and 122. Notification graphical elements 126, 128, and 122 may each correspond to single, distinct instances of notification data. A singular notification graphical element may correspond to a single, distinct instance of notification data generated by an application module. For instance, notification graphical element 126 may be generated by a travel application of application modules 139, notification graphical element 128 may correspond to an email client of application modules 139, and notification graphical element 122 may correspond to a calendar client of application modules 139. Although examples of this disclosure are described with respect to a travel application and email client, any types of applications may be used in accordance with techniques of the disclosure. A type of application may indicate the origin and/or functions provided by an application. For instance, a first type of application (e.g., email client) may originate from a first source (e.g., vendor) and perform a first set of functions, while a second type of application (e.g., travel application) may originate from a second source and perform a second set of functions, where the first and second sources and/or functions are different. Although examples of this disclosure are described with respect to two applications, any number of applications may be used in accordance with techniques of the disclosure.

In some examples, notification module 108 may store notification graphical elements 126, 128, and 122 in a set of notification graphical elements. Notification module 108 may implement the set of notification graphical elements as a map, list, array, or any other suitable data structure. In some examples, notification module 108 may order the display of notification graphical elements (e.g., in ascending or descending order) based on one or more criteria, such as but not limited to, priority of content associated with the notification graphical elements, recency of content associated with the notification graphical elements, or application frequency of use by a user for content associated with the notification graphical elements. In some examples, notification module 108 may order the display of notification graphical elements based on the type of notification graphical element, such as singular or bundled. For instance, notification module 108 may order the display of notification graphical elements such that bundled notification graphical elements are ordered at the top (e.g., nearest to status bar 119) of a graphical user interface 118 with singular notification graphical elements displayed below (or further from status bar 119) the bundled notification graphical elements in a descending manner. Such a relationship is illustrated with bundled notification graphical element 120 being displayed above singular notification graphical element 122 in graphical user interface 116.

As shown in FIG. 1, application module 139 could separately include each of notification graphical elements 126, 128, and 122 in graphical user interface 118, where UI module 106 could cause presence-sensitive display 104 to output graphical user interface 118. However, graphical user interface 118 may include duplicative content in each of singular notification graphical elements 126 and 128. For instance, each of singular notification graphical elements 126 and 128 may correspond to the same flight of the user to San Francisco, but the notification data for notification graphical elements 126 and 128 may have originated from separate applications (e.g., a travel application and email client).

Rather than displaying multiple, singular notification graphical elements 126 and 128 that each correspond to the same flight, techniques of the disclosure may determine whether content of the notification data for singular notification graphical element 126 has a relationship to at least a portion of content of the notification data for singular notification graphical elements 128 and 122. By determining that a relationship exists between the content of notification graphical elements 126 and 128, techniques of the disclosure may output for display, a single bundle notification graphical element that represents multiple instances of notification data, rather two separate singular notification graphical elements 128 and 122.

Determining that a relationship exists between the content of notification graphical elements 126 and 128 enables notification module 108 to generate a bundle notification graphical element, which consumes less screen real estate at presence-sensitive display 104 than displaying two separate singular notification graphical elements 128 and 122. As such, techniques of the disclosure may reduce the amount of effort needed by a user to evaluate and act upon notification graphical elements. Accordingly, the techniques may allow more distinct notification graphical elements to be output in a graphical user interface by reducing the quantity of notification graphical elements that correspond to duplicate content.

In operation and as described above, notification module 108 may receive different, instances of notification data from the travel application and email applications, respectively, of application modules 139. Notification module 108 may extract the content from each instance of notification data and send the content to affinity module 110. In other examples, notification module 108 may send instances of notification data to affinity module 110, and affinity module 110 may extract the content from each instance. In either case, affinity module 110 may store the content of each instance of notification data. In the example of FIG. 1, affinity module 110 may store all or a portion of content of each instance of notification data in notification content data store 117. Affinity module 110 may store content in a structured manner, for instance, affinity module 110 may extract content corresponding to a title from the notification data and store the extracted content as data of a type 'title'. Affinity module 110 may extract content corresponding to a body from the notification data and store the extracted content as data of a type 'body'. In this way, affinity module 110 may compare similar-type content from different instances of notification data. Although affinity module 110 is shown separately, some or all of the functionality of affinity module 110 may be included within notification module 108.

Affinity module 110 may compare content of the notification data for the travel application to the content of the notification data for the email client. Based on the comparison, affinity module 110 may generate an affinity score that indicates whether content of the first notification data has a relationship to at least a portion of content of the second notification data. In some examples, an affinity score may be a Boolean value, integer value, non-integer value, or enumerated value to name only a few examples. Although some examples of this disclosure describe affinity module 110 generating an affinity score with one or more Jaccard coefficients, any number of techniques may be used, such as Euclidean distance, or any other measurement that indicates a degree of similarity between two sets of words.

To perform the comparison in FIG. 1, affinity module 110 may implement a shingling technique to generate an affinity score. In the shingling technique, affinity module 110 may select the content for notification data corresponding to the travel application, which may include text representing the title and body of the notification data. Affinity module 110 may extract a set of n-grams from the text to generate a set of n-grams, where n is greater than 0. An n-gram itself may be a sequence of n discrete character strings, where each discrete character string may follow one another in sequence. The n-gram may include each i-th word in a sequence of words, where i is greater than 1. For instance, affinity module 110 may extract, from text representing a body in notification data for the travel application, the following set of example bi-grams: "your flight", "flight to", "to San", "San Francisco", "Francisco departs", "departs at", "at 12:45 pm", and "12:45 pm today." The text representing a body in notification data for the travel application may include the sentence "Your flight to San Francisco departs at 12:45 pm today . . . " Affinity module 110 may generate separate sets of n-grams for different portions of notification data. For instance, affinity module 110 may generate a separate set of n-grams for content in a title and a separate set of n-grams for content in a body. In other examples, may generate a set of n-grams including content from different portions of notification data.

To perform the comparison to generate an affinity score, affinity module 110 may also extract, from text representing a body in notification data for the email client, the following set of example bi-grams: "information for", "for your", "your flight", "flight to", "to San", and "San Francisco". The text representing a body in notification data for the travel application may include the sentence "Information for your flight to San Francisco . . . " Affinity module 110 may generate n-grams for content included in the titles of notification data received from the travel application and email client, respectively. Using the shingling technique, affinity module 110 may generate an affinity score that represents a Jaccard coefficient. The Jaccard coefficient may be equal to a size of the set intersection divided by a size of union, or more formally:

$$J(A, B) = \frac{|A \cap B|}{|A \cup B|}$$

where A is the set of n-grams from content of a first instance of notification data, and where B is the set of n-grams from content of a second instance of notification data.

To calculate the Jaccard coefficient, affinity module 110 may determine a size of the union, $|A \cup B|$, that combines the set of n-grams from notification data for the travel application with the set of n-grams from notification data for the email client. The size may be a count determined by affinity module 110 that represents the sum of n-grams from notification data for the travel application and the set of n-grams from notification data for the email client. For instance, if the count of n-grams from the notification data for the travel application is 8 and the count of n-grams from the notification data for the email application is 6, the size of the union is 14, if there are 14 distinct n-grams. Affinity module 110 may also determine a size of the interaction $|A \cap B|$, which represents a count of the n-grams that are included in both of sets A and B. Affinity module 110 may generate the affinity score between two instances of notification data as a Jaccard coefficient in the example of FIG. 1, by dividing the size of the interaction $|A \cap B|$ by the size of the union $|A \cup B|$. For instance, affinity module 110 may determine that the affinity score, generated based on comparing the notification data from the travel application and email client, is 4/14 or 0.286 because 4 n-grams are included in the union of 14 total n-grams.

Figure 2:
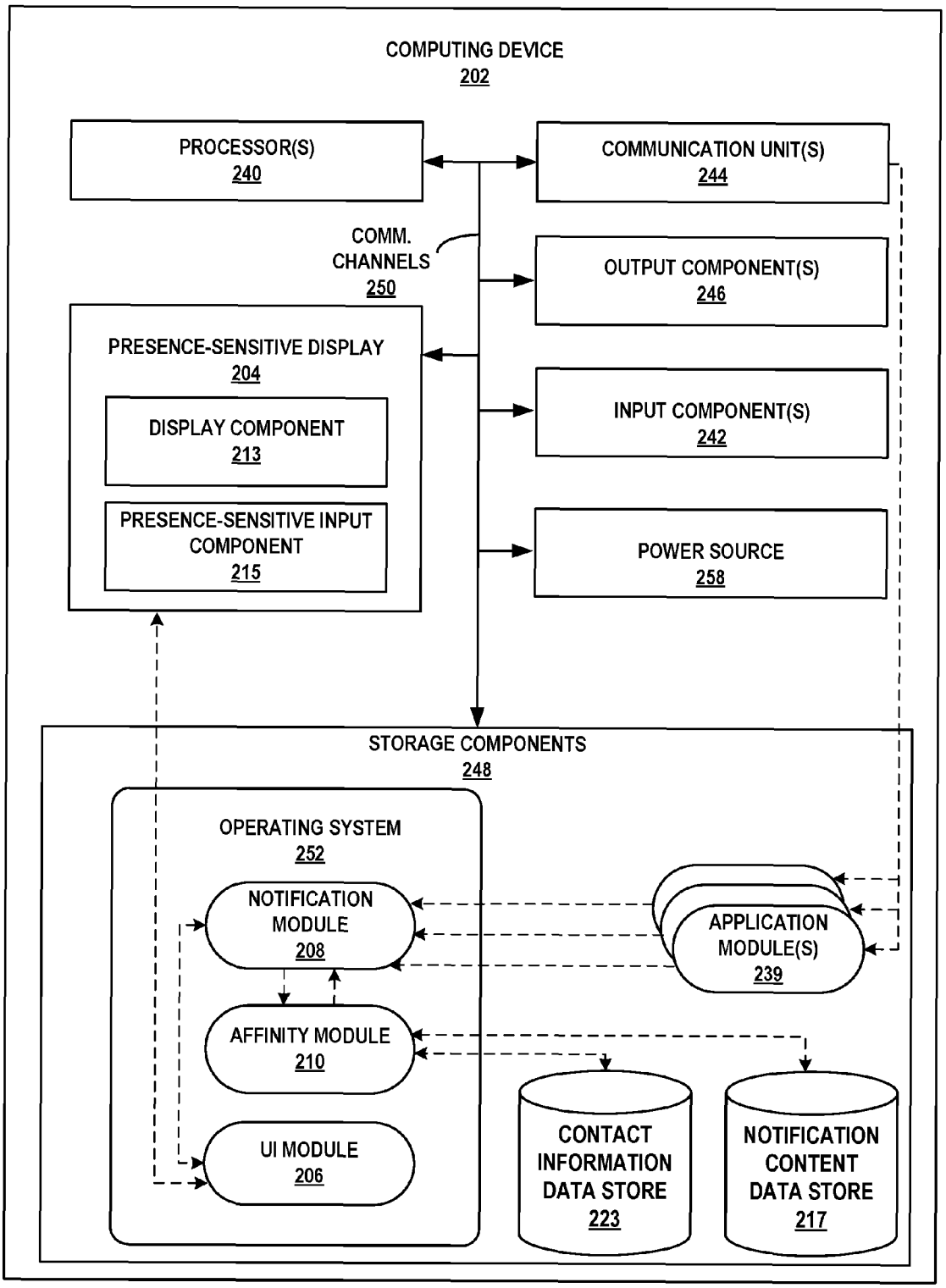
FIG. 2 is a block diagram illustrating an example computing device, in accordance with one or more aspects of the present disclosure.

As further described in FIG. 2, affinity module 110 may generate the affinity score based one or more other scores. For instance, affinity module 110 may generate the affinity score based on weighted Jaccard coefficients that correspond respectively to n-grams for the titles of two instances of notification data and n-grams for the bodies of the two instances of notification data. The title Jaccard coefficient may be weighted differently than the body Jaccard coefficient.

Affinity module 110 may compare the affinity score to a threshold. In some examples, the threshold may be set by a user, hard-coded, or dynamically set based on one or more criteria. Affinity module 110 may determine, based on the comparison, whether the affinity score satisfies a threshold. In some examples, an affinity score greater than or equal to the threshold satisfies the threshold. In some examples, an affinity score less than or equal to the threshold satisfies the threshold. In some examples, an affinity score that matches the truth of the threshold satisfies the threshold. In some examples, an affinity score that matches an enumerated value of the threshold satisfies the threshold.

In the example of FIG. 1, affinity module 110 determines that the affinity score (e.g., Jaccard coefficient) satisfies a threshold. In response to determining that the affinity score satisfies the threshold, affinity module 110 sends an indication to notification module 108 that the affinity score satisfies the threshold. In some examples, the indication may be a Boolean value indicating that a relationship exists (e.g., true) between two instances of notification data. In some examples, the indication may be the affinity score itself that was generated by affinity module 110, or the indication may be any other suitable data to indicate that a relationship exists between two instances of notification data.

Based on the indication received from affinity module 110, notification module 108 generates a bundle notification graphical element 120 that includes at least a portion of the content from the notification data for the travel application. Bundle notification graphical element 120 is further accompanied by a graphical indicator 124 that indicates the content of the notification data for the travel application is related to at least the portion of the content from the notification data for the email client. In some examples, rather than generating separate, singular notification graphical elements 126 and 128, affinity module 110 generates the bundle notification graphical element 120 without generating separate singular notification graphical elements 126 and 128.

Figure 4:
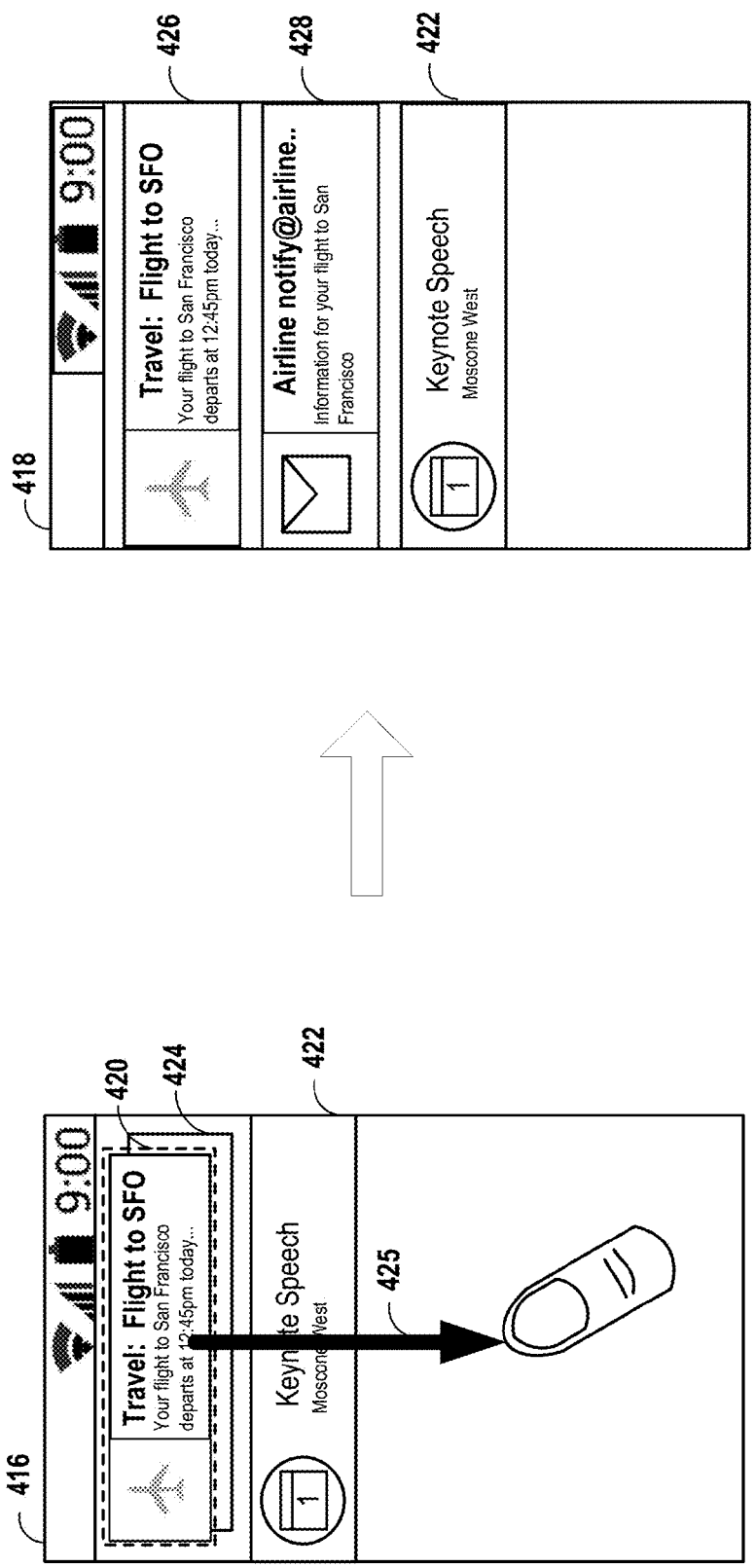
FIG. 4 illustrates an expansion of a bundle notification graphical element into multiple singular bundle notification graphical elements, in accordance with techniques of this disclosure.

In the example of FIG. 1, graphical indicator 124 accompanies bundle notification graphical element 120 to indicate that a relationship exists between respective, instances of notification data from the travel application and email client. In some examples, notification module 108 causes a graphical indicator that indicates a relationship between two instances of notification data to accompany a bundle notification graphical element by including the graphical indicator within the boundary of the bundle notification graphical element, such as shown in FIG. 1 with graphical indicator 124 included within the boundary of bundle notification graphical element 120. In some examples, notification module 108 causes a graphical indicator that indicates a relationship between two instances of notification data to accompany a bundle notification graphical element by displaying a graphical indicator within a threshold distance from the bundle notification graphical element, such as illustrated in FIG. 4. In some examples, the threshold distance may be a threshold number of pixels. The threshold distance may be set by a user, hard-coded, or dynamically set based on one or more criteria.

Although graphical indicator 124 is illustrated as an additional image that is included within the boundary of bundle notification graphical element 120, notification module 108 may output a graphical indicator without adding an additional image to graphical user interface 116. For instance, notification module 108 may cause a graphical indicator that indicates a relationship between two instances of notification data to accompany a bundle notification graphical element by applying, as the graphical indicator, a visual effect (e.g., color, size, orientation, shape, animation, to name only a few examples) to the bundle notification graphical element, such that the bundle notification graphical element is visually distinguishable in a graphical user interface from other types of notification graphical elements, such as a singular notification graphical element.

In the example of FIG. 1, notification module 108 may send data representing bundle notification graphical element 120 accompanied by graphical indicator 124 to UI module 106. Notification module 108 may also send data representing singular notification graphical element 122 to UI module 106. In some examples, notification module 108 may send the data for elements 120 and 122 as a set. In any case, UI module 106 may cause presence-sensitive display 104 to output the set of notifications including bundle notification graphical element 120 accompanied by the graphical indicator 124 in graphical user interface 116. UI module 106 may cause presence-sensitive display 104 to output singular notification graphical element 122, which represents a third, single instance of notification data received from the calendar client. As shown in FIG. 1, graphical user interface 116 includes both of graphical elements 120 and 122, with graphical element 120 accompanied by graphical indicator 124 that indicates a relationship between instances of notification data from the travel application and email client.

As shown in FIG. 1, in some examples, each notification graphical element (e.g., 120 and 122) of the set of notification graphical elements is substantially the same size. In some examples, each of the set of notification graphical elements is substantially the same size if a variation in the size of each notification graphical element relative to other notification graphical elements is less than 5%. In some examples, each of the set of notification graphical elements is substantially the same size if a variation in the size of each notification graphical element relative to other notification graphical elements is within a range of 0-10%. As shown in FIG. 1, in some examples, each notification graphical element (e.g., 120 and 122) of the set of notification graphical elements is arranged in a uniform alignment along at least one of a vertical or horizontal axis of graphical user interface 116. For instance, notification graphical elements are arranged in a uniform alignment along a y-axis (e.g., longer edge of graphical user interface 116) in a columnar arrangement. In some examples, each of notification graphical elements (e.g., 120 and 122) are not overlapping, such as shown in FIG. 1.

By outputting a single, bundle notification graphical element 120 that represents two instances of notification data having related content, techniques of the disclosure may reduce or eliminate the display of duplicate information from different instances of notification data. As described with respect to FIG. 2, techniques of this disclosure may bundle notification data based at least in part on the sender of content for a notification (e.g., bundling email, text message, and social media notification data from the same sender) or a common topic associated with content included in multiple instances of notification data (e.g., bundling notification data for the World Cup or soccer). As further described with respect to FIG. 4, the user may provide user input to interact with bundle notification graphical element 120, such as expanding bundle notification graphical element 120 to expose different, singular notification graphical elements for each individual instance of notification data that are related to one another. As further described with respect to FIG. 5, the user may provide user input to interact with bundle notification graphical element 120, such as launching (e.g., opening) a canonical application, which generated one of the multiple instances of notification data.

In some examples, if computing device 102 is a wearable computing device, such as a smart watch, computing device 102 may act as a companion device to an external computing device (not shown), such as a smart phone. In this example, the external computing device may communicate with computing device 102 to send notification data to computing device 102. For example, in response to receiving a text message, the external computing device may communicate a notification data associated with the text message to computing device 102 to cause presence-sensitive display 104 to output one or more graphical elements associated with the notification data.

FIG. 2 is a block diagram illustrating an example computing device 210, in accordance with one or more aspects of the present disclosure. FIG. 2 illustrates only one particular example of computing device 202 (as also illustrated at computing device 102 in FIG. 1). Many other examples of computing device 202 may be used in other instances and may include a subset of the components included in example computing device 202 or may include additional components not shown example computing device 202 in FIG. 2.

As shown in the example of FIG. 2, computing device 202 includes one or more processors 240, one or more input components 242, one or more communication units 244, one or more output components 246, one or more storage devices 248, and presence-sensitive display 212. Storage devices 248 of computing device 202 also include UI module 206, notification module 208, affinity module, 210, application modules 239, and operating system 252. Communication channels 250 may interconnect each of the components 240, 212, 213, 214, 244, 246, 242, 248, 252, 208, 210, 206, 239 for inter-component communications (physically, communicatively, and/or operatively). In some examples, communication channels 250 may include a system bus, a network connection, one or more inter-process communication data structures, or any other components for communicating data between hardware and/or software.

One or more processors 240 may implement functionality and/or execute instructions within computing device 202. For example, processors 240 on computing device 202 may receive and execute instructions stored by storage devices 248 that provide the functionality of operating system 252, notification module 208, affinity module 210, UI module 206, and application modules 239. These instructions executed by processors 240 may cause computing device 202 to store and/or modify information, within storage devices 248 during program execution. Processors 240 may execute instructions of operating system 252, notification module 208, affinity module 210, UI module 206, and application modules 239 to perform one or more operations. That is, operating system 252, notification module 208, affinity module 210, UI module 206, and application modules 239 may be operable by processors 240 to perform various functions described in this disclosure.

One or more input components 242 of computing device 202 may receive input. Examples of input are tactile, audio, kinetic, and optical input, to name only a few examples. Input components 242 of computing device 202, in one example, include a mouse, keyboard, voice responsive system, video camera, buttons, control pad, microphone or any other type of device for detecting input from a human or machine. In some examples, input component 242 may be a presence-sensitive input component, which may include a presence-sensitive screen, touch-sensitive screen, etc.

One or more output components 246 of computing device 202 may generate output. Examples of output are tactile, audio, and video output. Output components 246 of computing device 202, in some examples, include a presence-sensitive screen, sound card, video graphics adapter card, speaker, cathode ray tube (CRT) monitor, liquid crystal display (LCD), or any other type of device for generating output to a human or machine. Output components may include display components such as cathode ray tube (CRT) monitor, liquid crystal display (LCD), Light-Emitting Diode (LED) or any other type of device for generating tactile, audio, and/or visual output.

In some examples, presence-sensitive display 204 of computing device 202 may include functionality of input component 242 and/or output components 246. In the example of FIG. 2, presence-sensitive display 204 may include a presence-sensitive input component 215, such as a presence-sensitive screen or touch-sensitive screen. In some examples, presence-sensitive input component 215 may detect an object at and/or near the presence-sensitive input component. As one example range, presence-sensitive input component 215 may detect an object, such as a finger or stylus that is within two inches or less of presence-sensitive input component 215. Presence-sensitive input component 215 may determine a location (e.g., an (x,y) coordinate) of the presence-sensitive input component at which the object was detected. In another example range, presence-sensitive input component 215 may detect an object two inches or less from presence-sensitive input component 215 and other ranges are also possible. Presence-sensitive input component 215 may determine the location of presence-sensitive input component 215 selected by a user's finger using capacitive, inductive, and/or optical recognition techniques.

In some examples, presence-sensitive display 204 may also provide output to a user using tactile, audio, or video stimuli as described with respect to output component 246. For instance, presence-sensitive display 204 may include display component 213 that presents a graphical user interface. Display component 213 may be any type of output component that provides visual output, such as described with respect to output components 246. While illustrated as an integrated component of computing device 202, presence-sensitive display 204 may, in some examples, be an external component that shares a data path with other components of computing device 202 for transmitting and/or receiving input and output. For instance, presence-sensitive display 204 may be a built-in component of computing device 202 located within and physically connected to the external packaging of computing device 202 (e.g., a screen on a mobile phone). In another example, presence-sensitive display 204 may be an external component of computing device 202 located outside and physically separated from the packaging of computing device 202 (e.g., a monitor, a projector, etc. that shares a wired and/or wireless data path with a tablet computer). In some examples, presence-sensitive display 204, when located outside of and physically separated from the packaging of computing device 202, may be implemented by two separate components: a presence-sensitive input component 215 for receiving input and a display component 213 for providing output.

One or more communication units 244 of computing device 202 may communicate with external devices by transmitting and/or receiving data. For example, computing device 202 may use communication units 244 to transmit and/or receive radio signals on a radio network such as a cellular radio network. In some examples, communication units 244 may transmit and/or receive satellite signals on a satellite network such as a Global Positioning System (GPS) network. Examples of communication units 244 include a network interface card (e.g. such as an Ethernet card), an optical transceiver, a radio frequency transceiver, a GPS receiver, or any other type of device that can send and/or receive information. Other examples of communication units 244 may include Bluetooth®, GPS, 3G, 4G, and Wi-Fi® radios found in mobile devices as well as Universal Serial Bus (USB) controllers and the like.

One or more storage devices 248 within computing device 202 may store information for processing during operation of computing device 202. In some examples, storage device 248 is a temporary memory, meaning that a primary purpose of storage device 248 is not long-term storage. Storage devices 248 on computing device 202 may configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art.

Storage devices 248, in some examples, also include one or more computer-readable storage media. Storage devices 248 may be configured to store larger amounts of information than volatile memory. Storage devices 248 may further be configured for long-term storage of information as non-volatile memory space and retain information after activate/off cycles. Examples of non-volatile memories include magnetic hard discs, optical discs, floppy discs, flash memories, or forms of electrically programmable memories (EPROM) or electrically erasable and programmable (EEPROM) memories. Storage devices 248 may store program instructions and/or data associated with operating system 252, notification module 208, affinity module 210, UI module 206, and application modules 239.

As shown in FIG. 2, computing device 202 may include a power source 258. In some examples, power source 258 may be a battery. Power source 258 may provide power to one or more components of computing device 202. Examples of power source 258 may include, but are not necessarily limited to, batteries having zinc-carbon, lead-acid, nickel cadmium (NiCd), nickel metal hydride (NiMH), lithium ion (Li-ion), and/or lithium ion polymer (Li-ion polymer) chemistries. In some examples, power source 258 may have a limited capacity (e.g., 1000-3000 mAh).

In accordance with techniques of the disclosure, application modules 239 may generate notification data that is sent to notification module 208. In some examples, content for the notification data may be received from communication units 244 or may be generated by application modules 239 without receiving content from communication units 244. In any event notification module 208 may receive first notification data from a first application and second notification data from a second application. As described in FIG. 1, notification module 208 may extract the content from each instance of notification data and send the content to affinity module 210. In some examples, notification module 208 may store content from an instance of notification data in notification content data store 217.

Affinity module 210 may compare content of the notification data for the first application to the content of the notification data for the second client. Based on the comparison, affinity module 210 may generate an affinity score that indicates whether content of the first notification data has a relationship to at least a portion of content of the second notification data. For instance, affinity module 210 may generate one or more Jaccard coefficients as described in FIG. 1. Affinity module 210 may determine that the affinity score satisfies a threshold and notify notification module 208. Notification module 208 may generate a bundle notification graphical element that includes at least a portion of the content from the first notification data. The bundle notification graphical element is also accompanied by a graphical indicator that indicates the content from the first notification data is related to at least the portion of the content from the second notification data. Notification module 208 may send data to UI module 206 that causes display component 213 to output, for display, a set of notifications comprising the bundle notification graphical element accompanied by the graphical indicator, and the set of notifications comprising at least one other singular notification graphical element that represents a third, single instance of notification data.

In some examples, as described in FIG. 1, affinity module 210 may generate an affinity score based on weighted Jaccard coefficients that correspond respectively to n-grams for the titles of multiple instances of notification data and n-grams for the bodies of the multiple instances of notification data. The title Jaccard coefficient may be weighted differently than the body Jaccard coefficient. For instance, affinity module 210 may store one or more weights (e.g., integer value or non-integer value), which may be set by a user, hard-coded, or dynamically set based on one or more criteria. As an example, affinity module 210 may store a first weight that affinity module 210 applies to a Jaccard coefficient based on n-grams for the titles of multiple instances of notification data. Affinity module 210 may store a second weight that affinity module 210 applies to a Jaccard coefficient based on n-grams for the bodies of multiple instances of notification data. The first weight may be different than the second weight. For instance the first weight may be greater than the second weight or less than the second weight. Affinity modules 210 may generate a weighted affinity score that is the weighted sum of such Jaccard coefficients. For instance, a weighted sum of such Jaccard coefficients may be represented as follows, where $J_{title}$ is the Jaccard coefficient for the title, $w_{titl}$ is the weight for the title, $J_{body}$ is the Jaccard coefficient for the title, and $W_{body}$ is the weight for the body:

$$\text{AffinityScore} = (J_{title} \cdot w_{title}) + (J_{body} \cdot w_{body})$$

If the overall score between two or more notifications satisfies a threshold, affinity module 210 determines that the two notifications are duplicates and merges them into the same bundle.

Although weights for the body and title are shown, any number of weights may be applied to any number of coefficients or other values that indicate a degree of similarity between content of multiple notifications. For instance, affinity module 210 may store or access a dictionary of words from a written language. Each word in the dictionary may have a corresponding frequency value associated with the word. The frequency value may include the likelihood of the word and/or the frequency with which the word occurred in a corpus of words that was used to generated the dictionary. Affinity module 210 may apply higher weights to less common or frequently used words that appear in multiple instances of notification data. For instance, the word "the" may have a higher frequency value than "Singapore" and therefore the presence of "Singapore" in content of multiple notifications may indicate a stronger relationship between the multiple notifications than the word "the". As such, affinity module 210 may apply a higher weight, which represents the lower frequency of the word "Singapore", to a Jaccard coefficient than a lower weight for the word "the". As with other examples described in this disclosure, affinity module 210 may compare the affinity score based on the weighted Jaccard coefficient to a threshold. In some examples, affinity module 210 may learn the weights for different words using machine learning. In some examples, coefficients for the title and body, respectively, may be combined using a machined learned model.

In some examples, affinity module 210 may generate an affinity score that indicates whether content, such as contact or sender, of a first instance of notification data has a relationship to a contact or sender of a second instance of notification data. In this way, affinity module 210 may cause notification module 208 to group notifications from the same contact or sender together, such as by outputting for display a bundle notification graphical element that represents multiple notifications from the same contact or sender.

To identify multiple instances of notification data that are related by a common contact or sender, affinity module 210 may query contact information data store 223. Contact information data store 223 may be an address book, contact store or any other repository of contact information. Contact information data store 223 may include contact information such as, but is no limited to: name, phone numbers, email addresses, social media identifiers, messaging identifiers, and the like. In some examples, all or a portion of contact information data store 223 may be stored at a remote computing device that is accessible to computing device 202. A user of computing device 202 may store contact information for other individuals in contact information data store. In some examples, computing device 202 and/or one or more other computing devices may automatically populate contact information data store 223 with contact information by extracting the information from various sources, such as emails, phone records, social media, context messages, directories, and any other source of contact information.

To identify multiple instances of notification data that are related by a common contact or sender, affinity module 210 may compare content from multiple instances of notification data. In some examples, the comparison may be between the instances of notification data and/or between instances of notification data and contact information in contact information data store 223. The content may be, but not limited to, the title of each instance of notification data.

The title of an instance of notification data may include contact information, such the name of the sender and/or a unique identifier of the sender. Affinity module 210 may, for instance, compare the title of a first instance of notification data that includes the name "Jerry Smith" to the title of a second instances of notification data includes the name "Jerry P. Smith". Using techniques described in FIGS. 1 and 2, affinity module 210 may generate a Jaccard coefficient based on comparing "Jerry Smith" of the first instance of notification data to one or more instances or records of contact information in contact information data store 223. Affinity module 210 may determine that the Jaccard coefficient based on comparing "Jerry Smith" of the first instance of notification data to one or more instances or records of contact information in contact information data store 223 satisfies a threshold. Accordingly, affinity module 210 may determine that the first instance of notification data that includes "Jerry Smith" is associated with the contact "Jerry P. Smith" in information data store 223.

Affinity module 210 may store a data structure or "cluster" that includes identifying information and/or references to "Jerry P. Smith" in information data store 223 and the first instance of notification data for "Jerry Smith". The data structure for the cluster may be an array, map, list, or any other suitable data structure. In some instances the data structure for the cluster may include a unique identifier for a contact that corresponds to the cluser. In this way, as affinity module 210 identifies additional instances of notification data that are associated with the contact "Jerry P. Smith" in information data store 223, affinity module 210 may include identifying information and/or references to the additional instances of notification data. For instance, affinity module 210 may determine that the Jaccard coefficient based on comparing "Jerry P. Smith" of the second instance of notification data to one or more instances or records of contact information in contact information data store 223 satisfies a threshold. Accordingly, affinity module 210 may determine that the second instance of notification data that includes "Jerry P. Smith" is also associated with the contact "Jerry P. Smith" in information data store 223. Affinity module 210 may store, in the cluster for contact "Jerry P. Smith", identifying information and/or a reference to the second instance of notification data for "Jerry P. Smith".

Affinity module 210 provide notification module 208 with access to the cluster for contact "Jerry P. Smith", which notification module 208 uses to generate a bundle notification graphical element that corresponds to each instance of notification data referenced by the cluster, where the cluster corresponds to a particular contact in contact information data store 23. In this way, notification module 208 may generate a bundle notification graphical element that corresponds to a group of notifications from a common sender or contact. Notification module 208 may send data to UI module 206 that causes display component 213 to output the bundle notification graphical element for display.

In some examples, and as described in FIG. 1, notification module 208 may extract the content from an instance of notification data and store the content in notification content data store 217. If notification module 208 later receives a subsequent instance of notification data, affinity module 210 may compare content from the subsequent instance of notification data with the content stored in notification content data store 217. In some examples, affinity module 210 may compare content from the subsequent instance of notification data with content stored in notification content data store 217, even if the content stored in notification content data store 217 was associated with a notification graphical element that the user previously dismissed. In doing so, affinity module 210 may avoid showing a notification graphical element for the subsequent notification data if the subsequent notification data relates to other notification data for a notification graphical element that was previously dismissed. For instance, affinity module 210 may store a time window value that represents a time duration. Examples of a time duration may be 12 hours, 24 hours, 7 days, or any other duration of time. The time window value may be an integer or non-integer value, and may be set by a user or hard-coded. When affinity module 210 receives subsequent notification data, affinity module 210 may compare the content of the subsequent notification data to content of contact information data store 223 that was generated and/or stored within the time window value. Although described with respect to a time duration, similar techniques may be applied by affinity module 210 to compare the content of the subsequent notification data to content of n-most recent number of instances of notification data.

Affinity module 210, upon receiving the subsequent instance of notification data, compares the content of the subsequent notification data to content of contact information data store 223 that was generated and/or stored within the time window value. If affinity module 210 determines that an affinity score based on the comparison satisfies a threshold and the content from data store 223 was included in a notification graphical element that was previously dismissed by the user, then affinity module 210 may refrain from outputting a notification graphical element for the subsequent notification data.

In some examples, affinity module 210 may implement one or more machine learning techniques to generate an affinity score. Such techniques may use a neural network or Support Vector Machine classifier that provides an affinity score indicating a confidence level that content from two or more instances of notification data are related. Affinity module 210 may initially train a model based on a training set of notification data, such that when content from two or more instances of notification data are inputted into the model, affinity module 210 may determine an affinity score.

In some examples, affinity module 210 may generate an affinity score that indicates whether content from a first instance of notification data has a relationship to at least a portion of content from a second instance of notification data based on a common topic. For instance affinity module 210 may access a knowledge base that is stored on the computing device 202 and/or one or more remote computing devices. The knowledge base may include a collection of words and relationships between the words. For instance, the knowledge base may be implemented as a graph where the nodes represent words and edges between the nodes represent relationships between the words. In some examples, an edge may have a corresponding weight that indicates a strength of a relationship between two words represented by two nodes. For instance, the words "soccer" and "world cup" may be represented by two nodes with an edge between the two nodes that indicates "soccer" is related to "world cup".

In some examples, affinity module 210 may, upon receiving an instance of notification data, extract the content and query the knowledge base to retrieve a set of words that are related to the content. For instance, affinity module 210 may submit a query to the knowledge base that includes content that includes "world cup" and the knowledge base may return the word "soccer" that represents a topic. Affinity module 210 may associate the word "soccer" with the first instance of notification data, such as by storing "soccer" as metadata for the first instance of notification data. The topic word "soccer" may represent a topic for the content of the first instance of notification data. Affinity module 210 may perform the same technique with respect to other instances of notification data, such that one or more instances of notification data are associated with one or more topics. Affinity module 210 may generate an affinity score between two or more instances of notification data by generating a Jaccard coefficient based on topic words included in metadata for each instance of notification data. If, for example, instances of notification data share the same topic, the corresponding Jaccard coefficient generated as the affinity score may satisfy a threshold. If the affinity score satisfies a threshold, affinity module 210 may determine that the two instances of notification data are related. Notification module 208 may generate a bundle notification graphical element for the topic that represents the two instances of notification data that are each related based on the topic. As such, notifications relating to the topic of "soccer" will be grouped together and represented as a single, bundle notification graphical element.

In some examples, notification module 208 may receive indications of user input that allow for notifications to be customized or silenced based on contact or based on application type. For instance, a user may provide a user input that causes notification module 208 to refrain from bundling notifications for a particular contact or application with other notifications. In some examples, a user may provide a user input that causes notification module 208 to refrain from outputting notifications for a particular contact or application altogether.

In some examples, notification module 208 may determine a priority or severity of notification data. For instance, the notification data may include metadata that indicates a priority or severity. If the severity or priority satisfies a threshold, notification module 208 may output a singular notification graphical element for the notification data, even if the affinity score generated based on the notification satisfies a threshold to bundle the notification data. In some examples, notification module 208 may cause computing device 202 to emit a different type, frequency, and/or intensity of feedback (e.g., audio, haptic, etc.) for a bundle notification graphical element than a singular notification graphical element.

Figure 3:
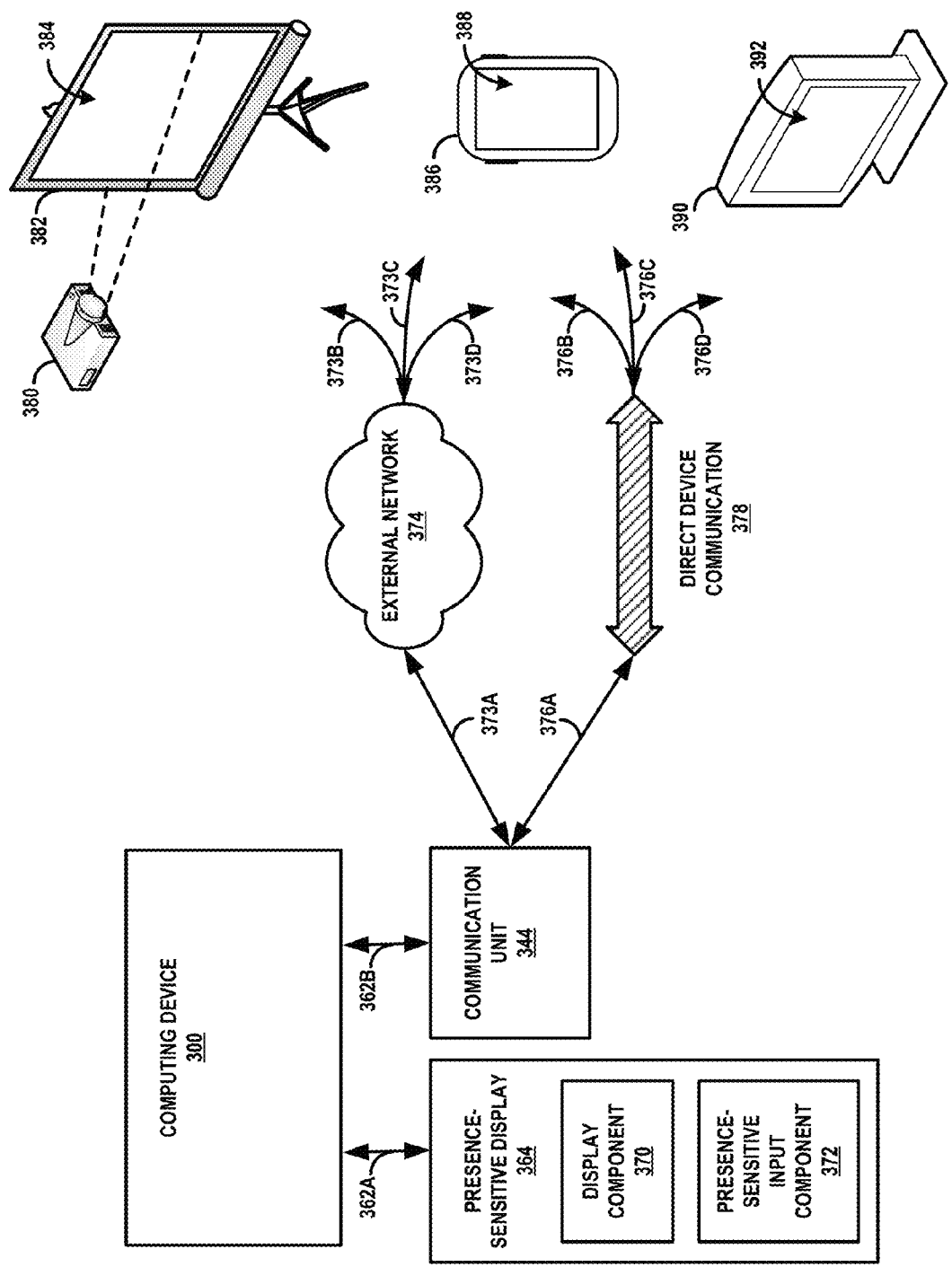
FIG. 3 is a block diagram illustrating an example computing device that outputs graphical content for display at a remote device, in accordance with one or more techniques of the present disclosure.

FIG. 3 is a block diagram illustrating an example computing device that outputs graphical content for display at a remote device, in accordance with one or more techniques of the present disclosure. Graphical content, generally, may include any visual information that may be output for display, such as text, images, a group of moving images, to name only a few examples. The example shown in FIG. 3 includes a computing device 300, a presence-sensitive display 364, communication unit 344, projector 380, projector screen 382, mobile device 386, and visual display component 390. In some examples, presence-sensitive display 364 may be a presence-sensitive display as described in FIGS. 1-2. Although shown for purposes of example in FIGS. 1 and 2 as a stand-alone computing device 100, a computing device such as computing device 300 may, generally, be any component or system that includes a processor or other suitable computing environment for executing software instructions and, for example, need not include a presence-sensitive display.

As shown in the example of FIG. 3, computing device 300 may be a processor that includes functionality as described with respect to processors 240 in FIG. 2. In such examples, computing device 300 may be operatively coupled to presence-sensitive display 364 by a communication channel 362A, which may be a system bus or other suitable connection. Computing device 300 may also be operatively coupled to communication unit 344, further described below, by a communication channel 362B, which may also be a system bus or other suitable connection. Although shown separately as an example in FIG. 3, computing device 300 may be operatively coupled to presence-sensitive display 364 and communication unit 344 by any number of one or more communication channels.

In other examples, such as illustrated previously by computing device 100 in FIGS. 1-2, a computing device may refer to a portable or mobile device such as mobile phones (including smart phones), laptop computers, etc. In some examples, a computing device may be a desktop computer, tablet computer, smart television platform, camera, personal digital assistant (PDA), server, or mainframes.

Presence-sensitive display 364 may include display component 370 and presence-sensitive input component 372. Display component 370 may, for example, receive data from computing device 300 and display the graphical content. In some examples, presence-sensitive input component 372 may determine one or more user inputs (e.g., continuous gestures, multi-touch gestures, single-touch gestures) at presence-sensitive display 364 using capacitive, inductive, and/or optical recognition techniques and send indications of such user input to computing device 300 using communication channel 362A. In some examples, presence-sensitive input component 372 may be physically positioned on top of display component 370 such that, when a user positions an input unit over a graphical element displayed by display component 370, the location at which presence-sensitive input component 372 corresponds to the location of display component 370 at which the graphical element is displayed.

As shown in FIG. 3, computing device 300 may also include and/or be operatively coupled with communication unit 344. Communication unit 344 may include functionality of communication unit 244 as described in FIG. 2. Examples of communication unit 344 may include a network interface card, an Ethernet card, an optical transceiver, a radio frequency transceiver, or any other type of device that can send and receive information. Other examples of such communication units may include Bluetooth, 3G, and WiFi radios, Universal Serial Bus (USB) interfaces, etc. Computing device 300 may also include and/or be operatively coupled with one or more other devices (e.g., input devices, output components, memory, storage devices) that are not shown in FIG. 3 for purposes of brevity and illustration.

FIG. 3 also illustrates a projector 380 and projector screen 382. Other such examples of projection devices may include electronic whiteboards, holographic display components, and any other suitable devices for displaying graphical content. Projector 380 and projector screen 382 may include one or more communication units that enable the respective devices to communicate with computing device 300. In some examples, the one or more communication units may enable communication between projector 380 and projector screen 382. Projector 380 may receive data from computing device 300 that includes graphical content. Projector 380, in response to receiving the data, may project the graphical content onto projector screen 382. In some examples, projector 380 may determine one or more user inputs (e.g., continuous gestures, multi-touch gestures, single-touch gestures) at projector screen using optical recognition or other suitable techniques and send indications of such user input using one or more communication units to computing device 300. In such examples, projector screen 382 may be unnecessary, and projector 380 may project graphical content on any suitable medium and detect one or more user inputs using optical recognition or other such suitable techniques.

Projector screen 382, in some examples, may include a presence-sensitive display 384. Presence-sensitive display 384 may include a subset of functionality or all of the functionality of presence-sensitive display 104 and/or 364 as described in this disclosure. In some examples, presence-sensitive display 384 may include additional functionality. Projector screen 382 (e.g., an electronic whiteboard), may receive data from computing device 300 and display the graphical content. In some examples, presence-sensitive display 384 may determine one or more user inputs (e.g., continuous gestures, multi-touch gestures, single-touch gestures) at projector screen 382 using capacitive, inductive, and/or optical recognition techniques and send indications of such user input using one or more communication units to computing device 300.

Although techniques of the disclosure have been described with respect to n-grams, the techniques could also be applied to other implementations. For instance, techniques of the disclosure may be used when word prediction is performed using language models implemented with neural networks, such as regular neural networks, recurrent neural networks, Long-Short Term Memories (LSTMs), or any other types of online learning. Another example may include retaining raw word/phrase counts instead of decomposing these values into n-grams. In such examples, the raw word/phrase counts may be used with k-nearest-neighbor search to find matches between words and user inputs.

FIG. 3 also illustrates mobile device 386 and visual display component 390. Mobile device 386 and visual display component 390 may each include computing and connectivity capabilities. Examples of mobile device 386 may include e-reader devices, convertible notebook devices, hybrid slate devices, etc. Examples of visual display component 390 may include other semi-stationary devices such as televisions, computer monitors, etc. As shown in FIG. 3, mobile device 386 may include a presence-sensitive display 388. Visual display component 390 may include a presence-sensitive display 392. Presence-sensitive displays 388, 392 may include a subset of functionality or all of the functionality of presence-sensitive display 104 and/or 364 as described in this disclosure. In some examples, presence-sensitive displays 388, 392 may include additional functionality. In any case, presence-sensitive display 392, for example, may receive data from computing device 300 and display the graphical content. In some examples, presence-sensitive display 392 may determine one or more user inputs (e.g., continuous gestures, multi-touch gestures, single-touch gestures) at projector screen using capacitive, inductive, and/or optical recognition techniques and send indications of such user input using one or more communication units to computing device 300.

As described above, in some examples, computing device 300 may output graphical content for display at presence-sensitive display 364 that is coupled to computing device 300 by a system bus or other suitable communication channel. Computing device 300 may also output graphical content for display at one or more remote devices, such as projector 380, projector screen 382, mobile device 386, and visual display component 390. For instance, computing device 300 may execute one or more instructions to generate and/or modify graphical content in accordance with techniques of the present disclosure. Computing device 300 may output the data that includes the graphical content to a communication unit of computing device 300, such as communication unit 344. Communication unit 344 may send the data to one or more of the remote devices, such as projector 380, projector screen 382, mobile device 386, and/or visual display component 390. In this way, computing device 300 may output the graphical content for display at one or more of the remote devices. In some examples, one or more of the remote devices may output the graphical content at a presence-sensitive display that is included in and/or operatively coupled to the respective remote devices.

In some examples, computing device 300 may not output graphical content at presence-sensitive display 364 that is operatively coupled to computing device 300. In other examples, computing device 300 may output graphical content for display at both a presence-sensitive display 364 that is coupled to computing device 300 by communication channel 362A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 300 and output for display at presence-sensitive display 364 may be different than graphical content display output for display at one or more remote devices.

Computing device 300 may send and receive data using any suitable communication techniques. For example, computing device 300 may be operatively coupled to external network 374 using network link 373A. Each of the remote devices illustrated in FIG. 3 may be operatively coupled to network external network 374 by one of respective network links 373B, 373C, or 373D. External network 374 may include network hubs, network switches, network routers, etc., that are operatively inter-coupled thereby providing for the exchange of information between computing device 300 and the remote devices illustrated in FIG. 3. In some examples, network links 373A-373D may be Ethernet, ATM or other network connections. Such connections may be wireless and/or wired connections.

In some examples, computing device 300 may be operatively coupled to one or more of the remote devices included in FIG. 3 using direct device communication 378. Direct device communication 378 may include communications through which computing device 300 sends and receives data directly with a remote device, using wired or wireless communication. That is, in some examples of direct device communication 378, data sent by computing device 300 may not be forwarded by one or more additional devices before being received at the remote device, and vice-versa. Examples of direct device communication 378 may include Bluetooth, Near-Field Communication, Universal Serial Bus, WiFi, infrared, etc. One or more of the remote devices illustrated in FIG. 3 may be operatively coupled with computing device 300 by communication links 376A-376D. In some examples, communication links 376A-376D may be connections using Bluetooth, Near-Field Communication, Universal Serial Bus, infrared, etc. Such connections may be wireless and/or wired connections.

In accordance with techniques of the disclosure, computing device 100 may receive, at a notification component that manages notifications at computing device 100, first notification data from a first application of computing device 100 and second notification data from a second application of computing device 100. Computing device 100 may generate, based at least in part on comparing the first notification data to the second notification data, an affinity score that indicates whether content from the first notification data has a relationship to at least a portion of content from the second notification data. Responsive to determining that the affinity score satisfies a threshold, computing device 100 may generate a bundle notification graphical element that includes at least a portion of the content from the first notification data, the bundle notification graphical element further being accompanied by a graphical indicator that indicates the content from the first notification data is related to at least the portion of the content from the second notification data. Computing device 100 may send data, via communication unit 344 and external network 374, that causes presence-sensitive display 392 to output, for display, a set of notifications comprising the bundle notification graphical element accompanied by the graphical indicator, and the set of notifications comprising at least one other singular notification graphical element that represents a third, single instance of notification data.

FIG. 4 illustrates an expansion of a bundle notification graphical element 420 into multiple singular bundle notification graphical elements, in accordance with techniques of this disclosure. FIG. 4 illustrates a graphical user interface 416 that may be output for display by a presence-sensitive display, such as presence-sensitive display 104. Graphical user interface 416 may be an example of graphical user interface 116 as described in FIG. 1. For instance, graphical user interface 416 may include bundle notification graphical element 420 and singular notification graphical element 422.

In the example of FIG. 4, a user may wish to expand bundle notification graphical element 420, so as to view a set of singular notification graphical elements 426 and 428 that correspond, respectively, to distinct notification data generated by separate applications and that are collectively represented as bundle notification graphical element 420 because a relationship exists between the distinct notification data. To expand bundle notification graphical element 420, a user may provide a user input at presence-sensitive display 104. In some examples, the user input may be a single-touch or multi-touch user input. Examples of single- or multi-touch user inputs may include tap, multi-tap, long-press, pinch, drag, rotate and the like. As shown in FIG. 4, a user of computing device 102 may provide a vertical drag-down single-touch gesture 425 to expand bundle notification graphical element 420 into multiple, singular notification graphical elements 426 and 428.

In some examples, gesture 425 must originate at a location within the boundary of bundle notification graphical element 420 to initiate the expansion, as shown in FIG. 4. Gesture 422 may originate at a location within the boundary of bundle notification graphical element 420 with the user moving her finger into proximity with presence-sensitive display 104, such that the finger is detectable by presence-sensitive display 104. The user may maintain her finger within the detectability of presence-sensitive display 104 and move her finger in a downward vertical direction as indicated by the arrow-head of gesture 425. In such examples, UI module 106 may send touch event data to notification module 108 that indicates vertical drag-down single-touch gesture 425. Notification module 108 may determine that vertical drag-down single-touch gesture 425 originates at a location within a boundary of bundle notification graphical element 420.

Based on determining that gesture 425 was initiated at a location of presence-sensitive display 104 that includes bundle notification graphical element 420, notification module 108 may determine the different instances of notification data associated with bundle notification graphical element 420. For instance, notification module 108 may store, for each bundle notification graphical element, a set of pointers or references that identify the respective instances or content of notification data that are represented by the respective bundle notification graphical element. In this way, if notification module 108 receives an indication of user input (e.g., gesture 425) to expand bundle notification graphical element 420, notification module 108 may select content from the respective instances of notification data that are represented by respective bundle notification graphical element 420. Upon selecting the respective content, notification module 108 may generate separate, singular notification graphical elements 426 and 428, which include the respective content from each respective instance of notification data that was represented by bundle notification graphical element 420.

In the example of FIG. 4, notification module 108, in response to receiving gesture 425 and generating singular notification graphical elements 426 and 428, may send data representing singular notification graphical elements 426 and 428 to UI module 106, which causes presence-sensitive display 104 to output graphical user interface 418 for display with singular notification graphical elements 426, 428, and 422. As illustrated in FIG. 4, the user may provide additional user inputs to interact with singular notification graphical elements 426, 428, and 422.

FIG. 4 also illustrates bundle notification graphical element 420 further being accompanied by a graphical indicator 424 that indicates the content from a first instance of notification data is related to at least the portion of content from a second instance of notification data. In the example of FIG. 4, graphical indicator 424 is similar in shape and size to bundle notification graphical element 420 but positioned behind bundle notification graphical element 420 in z-order within graphical user interface 416, such that bundle notification graphical element 420 and graphical indicator 424 appear to be cascaded. As such graphical indicator 424 accompanies bundle notification graphical element 420 by being positioned behind bundle notification graphical element 420 in z-ordering and offset from bundle notification graphical element 420 in the x-dimension and y-dimension by respective offset distances. The offset distances may be hard-coded or user-defined. In some examples, notification module 108 generates bundle notification graphical element 420 and graphical indicator 424 as a single image that is output for display by presence-sensitive display 104.

Figure 5:
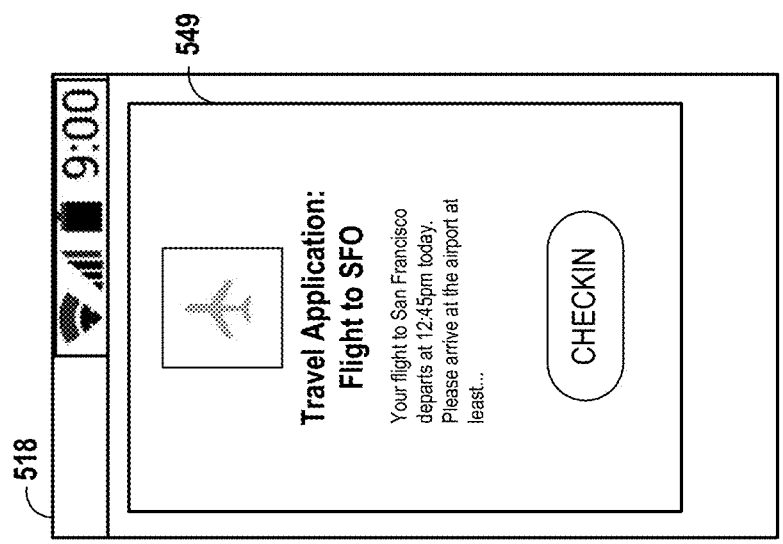
FIG. 5 illustrates a selection of a bundle notification graphical element and launch of a canonical application for notification data represented by the bundle notification graphical element, in accordance with techniques of this disclosure.
Figure 5:
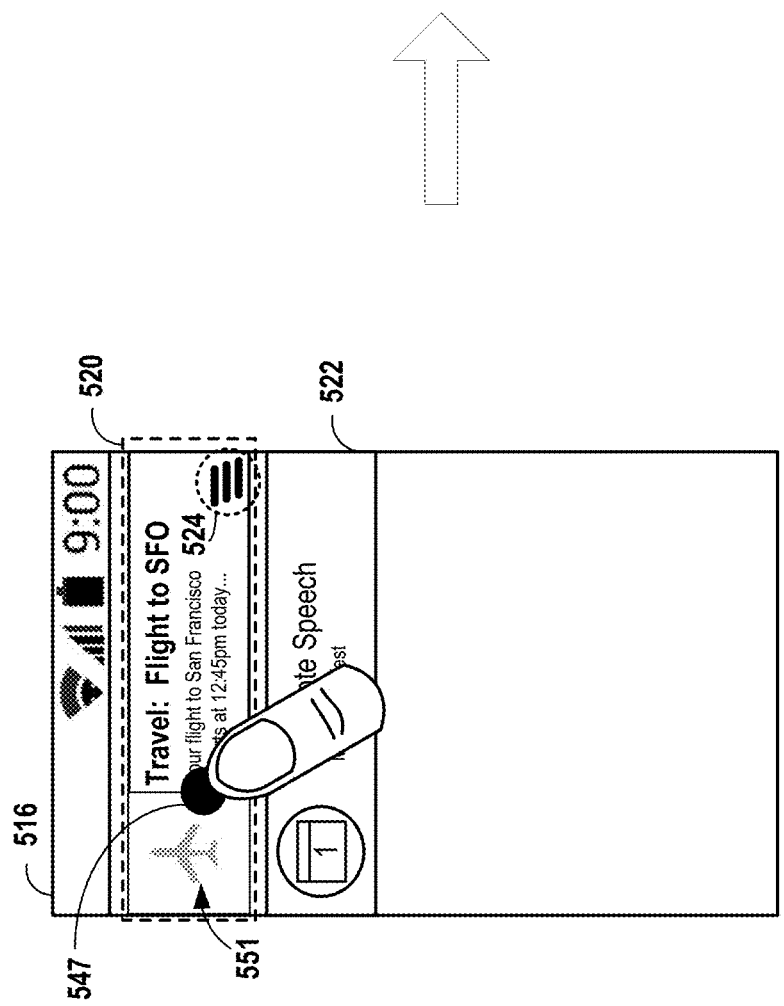

FIG. 5 illustrates a selection of a bundle notification graphical element and launch of a canonical application for notification data represented by the bundle notification graphical element, in accordance with techniques of this disclosure. FIG. 5 illustrates a graphical user interface 516 that may be output for display by a presence-sensitive display, such as presence-sensitive display 104. Graphical user interface 516 may be an example of graphical user interface 116 as described in FIG. 1. For instance, graphical user interface 516 may include bundle notification graphical element 520 and singular notification graphical element 522. Graphical user interface 516 may also include graphical indicator 524.

In some examples, a user may wish to select bundle notification graphical element 520 and further interact with an application that corresponds to the content displayed in bundle notification graphical element 520. As shown in FIG. 5, bundle notification graphical element 520 may represent a first instance of notification data generated by a travel application and a second instance of notification data generated by an email client, where a relationship exists between the content of the first and second instances of notification data.

Notification module 108, when generating bundle notification graphical element 520 may associate one of the travel application or the email client as the canonical application for bundle notification graphical element 520. UI module 106, upon detecting a user input at a location of bundle notification graphical element 520 to select element 520, may launch, execute, and/or otherwise display the canonical application associated with bundle notification graphical element 520. As shown in FIG. 5, content from the notification data generated by the canonical application is output for display as content of bundle notification graphical element 520, while content from notification data generated by other non-canonical applications may not be output for display. For instance, in FIG. 4, the canonical application is the travel application. Bundle notification graphical element 520 includes image 551 that is provided by notification data generated by the travel application, along with a title and body.

In some examples, to select a canonical application, notification module 108 may identify each application that generated notification data represented by bundle notification graphical element 520. For instance, notification module 108 may identify each of the travel application and the email client that generated respective instances of notification having related content. Notification module 108 may maintain, for each respective application that generates notifications, a historical count of the number of notifications generated by the respective application. For instance, notification module 108 may maintain or otherwise store, for each application, an application identifier and historical count of the number of notifications generated by the application. Each time the application generates notification data, notification module 108 may determine the application identifier for the application and increment the corresponding historical count. In some examples, notification module 108 may reset the historical count in response to an asynchronous event or on a periodic basis (e.g., per day, per week, or any other suitable interval).

In the example of FIG. 5, notification module 108, upon receiving respective instances of notification data from each of the travel application and the email client and determining that a relationship exists between content of the two instances of notification data, may determine the respective historical count for each of the travel application and the email application. Notification module 108 may select an application from the set of applications as the canonical application that has the fewest number of generated instances of notification data. That is, the canonical application may be the application from the set of applications that has the smallest historical count of the historical counts associated with the applications in the set of applications. If more than one application has the smallest historical count, notification module 108 may randomly select one of the applications as the canonical application, or may use one or more other criteria as described in this disclosure to select the canonical application for bundle notification graphical element 520.

In the example of FIG. 5, the travel application may have a corresponding historical count that is smaller than the historical count for the email application. As such, notification module 108 selects the travel application as the canonical application and associates the travel application with bundle notification graphical element 520 as the canonical application. In response to receiving a user input at location 547 of graphical user interface 516, UI module 6 may receive one or more touch events corresponding to the user input. UI module 106, upon detecting a user input at location 547 to select element 520, may launch, execute, and/or otherwise display a user interface 549 for the canonical application (e.g., the travel application) within graphical user interface 518.

Notification module 108 may determine the canonical application according to one or more other techniques, which may be used together or separately, and in combination or apart from the techniques described above. For instance, computing device 202 may store metadata for applications. The metadata for an application may indicate that the application is the canonical application for notification data with particular content. The metadata may be user-defined or hard-coded. In some examples, notification module may maintain or access data that indicates the frequency of use of applications. Notification module 108 may determine that the canonical application for a set of applications that generated related notification data is the most frequently used or most recently used application. In some examples, a user may provide a user input that sets a particular application as the canonical application. In some examples, notification module 108 may use machine learning techniques to determine the canonical application. For instance, if a user expands a bundle notification graphical element and selects singular notification graphical element, notification module 108 may use the selection as positive reinforcement to increase a score or likelihood that the application for the selected singular notification graphical element is the canonical application. Notification module 108 may use the score or likelihood value to determine whether the application for the selected singular notification graphical element is the canonical application.

In some examples, techniques of the disclosure may allow the user to dismiss the entire bundle notification graphical element or iteratively dismiss singular notification graphical element. For instance, in FIG. 5, the user may provide a bundle dismissal user input, such as a horizontal left swipe gesture that causes notification module 108 to dismiss bundle notification graphical element 520 entirely from graphical user interface 516. Alternatively, the user may provide a singular dismissal user input, such as a horizontal right swipe gesture (opposite to the bundle dismissal user input) that causes notification module 108 to dismiss only the currently displayed notification graphical element for bundle notification graphical element 520. For instance, in response to receiving a singular dismissal user input, notification module 108 may dismiss the "top level" or viewable notification graphical element of bundle notification graphical element 520 for the canonical application and display a next notification graphical element that corresponds to another instance of notification data that is associated with bundle notification graphical element 520. If the user provides another singular dismissal user input, notification module 108 may dismiss this next notification graphical element and display a subsequent notification graphical element, such that the user can iterate through each notification graphical element for notification data that corresponds to bundle notification graphical element 520. Although the bundle and singular dismissal user inputs are described as horizontal swipe gestures, any suitable form of user input may be used, such as but not include, single- and/or multi-touch gestures, motion gestures that move the computing device itself, voice input and the like.

In some examples, selecting an unexpanded bundle notification graphical element will trigger an event or "intent" associated with the canonical notification within a cluster or other data structure that includes state for the bundle notification graphical element. As described above, the canonical notification will be selected based upon specificity of the associated event or intent. For example, notification data that opens a specific application will take precedence over notification data that opens an email with related content.

Figure 6:
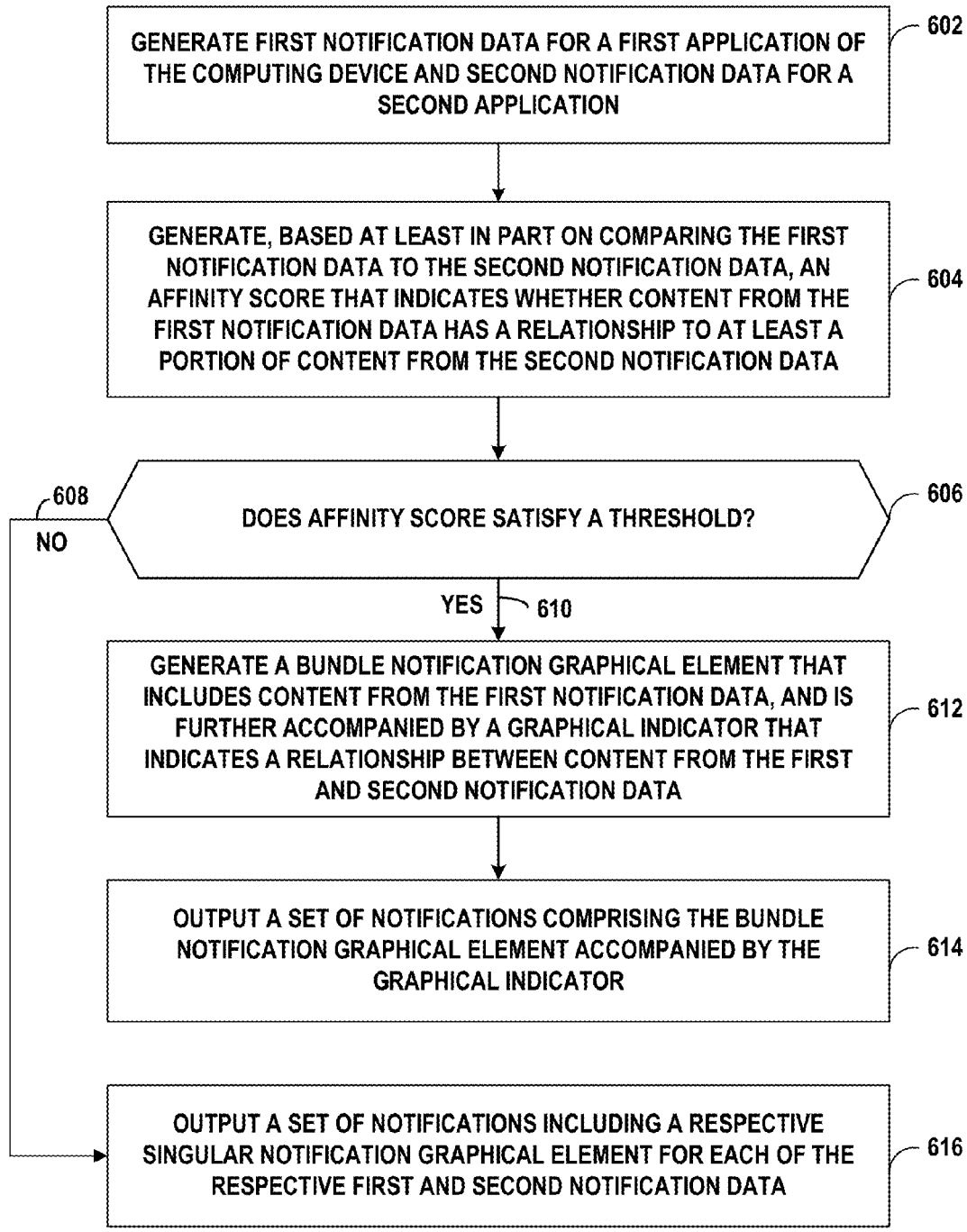
FIG. 6 is a flow diagram illustrating example operations of a computing device configured to identify relationships between different instances of notification data, and output a bundle notification graphical element for a bundle of related notifications, in accordance with techniques of this disclosure.

FIG. 6 is a flow diagram illustrating example operations of a computing device configured to identify relationships between different instances of notification data, and output a bundle notification graphical element for a bundle of related notifications, in accordance with techniques of this disclosure. For purposes of illustration only, the example operations are described below within the context of computing device 102 of FIG. 1.

Computing device 102 may generate first notification data for a first application and second notification data for a second application (602). For instance, a travel application may generate the first notification data and an email client may generate the second notification data. Computing device 102 may compare content of the first notification to content of the second notification to generate an affinity score (604). The affinity score, as described in this disclosure, may indicate whether content from the first notification data has a relationship to as least a portion of content from the second notification data. For instance, computing device 102 may generate a first Jaccard coefficient based on content in the bodies of the first and second notification data and may generate a second Jaccard coefficient based on contents in the titles of the first and second notification data. Computing device 102 may apply a first weight to the first Jaccard coefficient and a second weight to the second Jaccard coefficient, and then sum the weighted Jaccard coefficients to generate an affinity score.

Computing device 102 may determine whether the affinity score satisfies a threshold (606). If the affinity score does not satisfy a threshold (e.g., less than the threshold) (608), then computing device 102 may generate and output a set of notification for display, wherein the set includes a first singular notification graphical element for the first notification data and a second singular notification graphical element for the second notification data (616). If, however, the affinity score satisfies the threshold (e.g., is greater than or equal to the threshold) (610), computing device 102 may generate a bundle notification graphical element that includes content from the first notification data (612). As described in this disclosure computing device 102 may generate a graphical indicator that accompanies the bundle notification graphical element. The graphical indicator may indicate a relationship between content from the first and second notification data. Computing device 102 may output for display, a set of notifications that includes the bundle notification graphical element accompanied by the graphical indicator (614).

EXAMPLE 1

A method comprising: receiving, at a notification component that manages notifications at a computing device, first notification data from a first application of the computing device and second notification data from a second application of the computing device; generating, based at least in part on comparing the first notification data to the second notification data, an affinity score that indicates whether content from the first notification data has a relationship to at least a portion of content from the second notification data; responsive to determining that the affinity score satisfies a threshold, generating a bundle notification graphical element that includes at least a portion of the content from the first notification data, the bundle notification graphical element further being accompanied by a graphical indicator that indicates the content from the first notification data is related to at least the portion of the content from the second notification data; and outputting, by the computing device and for display, a set of notification graphical elements comprising the bundle notification graphical element accompanied by the graphical indicator, and the set of notification graphical elements comprising at least one other singular notification graphical element that represents a third, single instance of notification data.

EXAMPLE 2

The method of Example 1, further comprising: extracting the content from the first notification data and the content from the from the second notification data; generating a first set of n-grams based on the content from the first notification data and generating a second set of n-grams based on the content from the second notification data; and wherein generating the affinity score comprises generating the affinity score based at least in part on the first set of n-grams and the second set of n-grams.

EXAMPLE 3

The method of Example 1, wherein outputting the set of notifications further comprises outputting each notification graphical element of the set of notification graphical elements in a uniform alignment along at least one of a vertical or horizontal axis of a graphical user interface that is output for display, wherein each of the bundle notification graphical element and the singular notification graphical element are substantially the same size.

EXAMPLE 4

The method of Example 1, further comprising: generating a first, weighted Jaccard coefficient based at least in part on title content from the first notification data, title content from the second notification data, and a title content weight; generating a second, weighted Jaccard coefficient based at least in part on body content from the first notification data, body content from the second notification data, and a body content weight; and wherein generating the affinity score comprises generating the affinity score based at least in part on the first, weighted Jaccard coefficient and the second, weighted Jaccard coefficient.

EXAMPLE 5

The method of Example 1, wherein the notification component is executing with elevated execution privileges of an operating system.

EXAMPLE 6

The method of Example 1, further comprising: receiving an indication of user input that selects the bundle notification graphical element; determining a canonical application associated with the bundle notification graphical element; and outputting for display the canonical application.

EXAMPLE 7

The method of Example 6, wherein the canonical application is an application that has generated a fewest number of instances of notification data among a set of applications, wherein each of the set of applications has generated content represented by the bundle notification graphical element.

EXAMPLE 8

The method of Example 1, wherein the first notification data has the relationship to at least the portion of content from the second notification data based at least in part on the first notification data originating from a same sender as the second notification data.

EXAMPLE 9

The method of Example 1, further comprising: responsive to querying a knowledge base, based at least in part on the content of the first notification data, receiving a first set of topics; responsive to querying the knowledge base, based at least in part on the content of the second notification data, receiving a second set of topics; wherein generating the affinity score comprises generating the affinity score based at least in part on the first set of topics and the second set of topics.

EXAMPLE 10

The method of Example 1, wherein the affinity score is a first affinity store, the method further comprising:receiving, at the notification component, third notification data; generating, based at least in part on comparing the first notification data to the third notification data, a second affinity score that indicates whether content from the first notification data has a relationship to at least a portion of content from the third notification data; responsive to determining that the affinity score satisfies the threshold and the first notification data was received by the notification component within a time window, refraining from outputting a notification graphical element that represents the third notification data.

EXAMPLE 11

The method of Example 1, wherein the bundle notification graphical element and the graphical indicator collectively represent at least the first notification data and the second notification data.

EXAMPLE 12

A computing device comprising: one or more computer processors; and a memory comprising instructions that when executed by the one or more computer processors cause the one or more computer processors to: receive, at a notification component that manages notifications at the computing device, first notification data from a first application of the computing device and second notification data from a second application of the computing device; generate, based at least in part on comparing the first notification data to the second notification data, an affinity score that indicates whether content from the first notification data has a relationship to at least a portion of content from the second notification data; responsive to determining that the affinity score satisfies a threshold, generate a bundle notification graphical element that includes at least a portion of the content from the first notification data, the bundle notification graphical element further being accompanied by a graphical indicator that indicates the content from the first notification data is related to at least the portion of the content from the second notification data; and output, for display, a set of notification graphical elements comprising the bundle notification graphical element accompanied by the graphical indicator, and the set of notification graphical elements comprising at least one other singular notification graphical element that represents a third, single instance of notification data.

EXAMPLE 13

The computing device of Example 12, wherein the memory comprises instructions that when executed by the one or more computer processors cause the one or more computer processors to perform any of the method of Examples 2-11.

EXAMPLE 14

A non-transitory computer-readable storage medium encoded with instructions that, when executed, cause at least one processor of a computing device to: receive, at a notification component that manages notifications at the computing device, first notification data from a first application of the computing device and second notification data from a second application of the computing device; generate, based at least in part on comparing the first notification data to the second notification data, an affinity score that indicates whether content from the first notification data has a relationship to at least a portion of content from the second notification data; responsive to determining that the affinity score satisfies a threshold, generate a bundle notification graphical element that includes at least a portion of the content from the first notification data, the bundle notification graphical element further being accompanied by a graphical indicator that indicates the content from the first notification data is related to at least the portion of the content from the second notification data; and output, for display, a set of notification graphical elements comprising the bundle notification graphical element accompanied by the graphical indicator, and the set of notification graphical elements comprising at least one other singular notification graphical element that represents a third, single instance of notification data.

EXAMPLE 15

The non-transitory computer-readable storage medium of Example 14 encoded with instructions that, when executed, cause at least one processor of a computing device to perform any of the method of Examples 2-11.

EXAMPLE 16

An apparatus comprising: means for receiving first notification data from a first application of the apparatus and second notification data from a second application of the apparatus; means for generating, based at least in part on comparing the first notification data to the second notification data, an affinity score that indicates whether content from the first notification data has a relationship to at least a portion of content from the second notification data; means for, responsive to determining that the affinity score satisfies a threshold, generating a bundle notification graphical element that includes at least a portion of the content from the first notification data, the bundle notification graphical element further being accompanied by a graphical indicator that indicates the content from the first notification data is related to at least the portion of the content from the second notification data; and means for outputting, for display, a set of notification graphical elements comprising the bundle notification graphical element accompanied by the graphical indicator, and the set of notification graphical elements comprising at least one other singular notification graphical element that represents a third, single instance of notification data.

EXAMPLE 17

The apparatus of claim 16 comprising means for performing any of the method of Examples 2-11.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various aspects of the disclosure have been described. These and other aspects are within the scope of the following claims.

The invention claimed is:

1. A method comprising:
   receiving, at a notification component that manages notifications at a computing device, first notification data from a first application of the computing device and second notification data from a second application of the computing device;
   generating, based at least in part on comparing the first notification data to the second notification data, an affinity score that indicates whether content from the first notification data has a relationship to at least a portion of content from the second notification data;
   responsive to determining that the affinity score satisfies a threshold, generating a bundle notification graphical element that includes at least a portion of the content from the first notification data, the bundle notification graphical element further being accompanied by a graphical indicator that indicates the content from the first notification data is related to at least the portion of the content from the second notification data; and
   outputting, by the computing device and for display, a set of notification graphical elements comprising the bundle notification graphical element accompanied by the graphical indicator, and the set of notification graphical elements comprising at least one other singular notification graphical element that represents a third, single instance of notification data.

2. The method of claim 1, further comprising:
   extracting the content from the first notification data and the content from the second notification data;
   generating a first set of n-grams based on the content from the first notification data and generating a second set of n-grams based on the content from the second notification data; and
   wherein generating the affinity score comprises generating the affinity score based at least in part on the first set of n-grams and the second set of n-grams.

3. The method of claim 1, wherein outputting the set of notifications further comprises outputting each notification graphical element of the set of notification graphical elements in a uniform alignment along at least one of a vertical or horizontal axis of a graphical user interface that is output for display, wherein each of the bundle notification graphical element and the singular notification graphical element are substantially the same size.

4. The method of claim 1, further comprising:
   generating a first, weighted Jaccard coefficient based at least in part on title content from the first notification data, title content from the second notification data, and a title content weight;
   generating a second, weighted Jaccard coefficient based at least in part on body content from the first notification data, body content from the second notification data, and a body content weight; and
   wherein generating the affinity score comprises generating the affinity score based at least in part on the first, weighted Jaccard coefficient and the second, weighted Jaccard coefficient.

5. The method of claim 1, wherein the notification component is executing with elevated execution privileges of an operating system.

6. The method of claim 1, further comprising:
   receiving an indication of user input that selects the bundle notification graphical element;
   determining a canonical application associated with the bundle notification graphical element; and
   outputting for display the canonical application.

7. The method of claim 6, wherein the canonical application is an application that has generated a fewest number of instances of notification data among a set of applications, wherein each of the set of applications has generated content represented by the bundle notification graphical element.

8. The method of claim 1, wherein the first notification data has the relationship to at least the portion of content from the second notification data based at least in part on the first notification data originating from a same sender as the second notification data.

9. The method of claim 1, further comprising:
responsive to querying a knowledge base, based at least in part on the content of the first notification data, receiving a first set of topics;
responsive to querying the knowledge base, based at least in part on the content of the second notification data, receiving a second set of topics;
wherein generating the affinity score comprises generating the affinity score based at least in part on the first set of topics and the second set of topics.

10. The method of claim 1, wherein the affinity score is a first affinity store, the method further comprising:
receiving, at the notification component, third notification data;
generating, based at least in part on comparing the first notification data to the third notification data, a second affinity score that indicates whether content from the first notification data has a relationship to at least a portion of content from the third notification data;
responsive to determining that the second affinity score satisfies the threshold and the first notification data was received by the notification component within a time window, refraining from outputting a notification graphical element that represents the third notification data.

11. The method of claim 1, wherein the bundle notification graphical element and the graphical indicator collectively represent at least the first notification data and the second notification data.

12. A computing device comprising:
one or more computer processors; and
a memory comprising instructions that when executed by the one or more computer processors cause the one or more computer processors to:
receive, at a notification component that manages notifications at the computing device, first notification data from a first application of the computing device and second notification data from a second application of the computing device;
generate, based at least in part on comparing the first notification data to the second notification data, an affinity score that indicates whether content from the first notification data has a relationship to at least a portion of content from the second notification data;
responsive to determining that the affinity score satisfies a threshold, generate a bundle notification graphical element that includes at least a portion of the content from the first notification data, the bundle notification graphical element further being accompanied by a graphical indicator that indicates the content from the first notification data is related to at least the portion of the content from the second notification data; and
output, for display, a set of notification graphical elements comprising the bundle notification graphical element accompanied by the graphical indicator, and the set of notification graphical elements comprising at least one other singular notification graphical element that represents a third, single instance of notification data.

13. The computing device of claim 12, wherein the instructions when executed by the one or more computer processors cause the one or more computer processors to:
extract the content from the first notification data and the content from the from the second notification data;
generate a first set of n-grams based on the content from the first notification data and generate a second set of n-grams based on the content from the second notification data; and
wherein the instructions when executed by the one or more computer processors cause the one or more computer processors to generate an affinity score further comprise instructions that when executed by the one or more computer processors cause the one or more computer processors to generate the affinity score based at least in part on the first set of n-grams and the second set of n-grams.

14. The computing device of claim 12, wherein the instructions when executed by the one or more computer processors cause the one or more computer processors to output the set of notifications further comprise instructions that when executed by the one or more computer processors cause the one or more computer processors to output each notification graphical element of the set of notification graphical elements in a uniform alignment along at least one of a vertical or horizontal axis of a graphical user interface that is output for display, wherein each of the bundle notification graphical element and the singular notification graphical element are substantially the same size.

15. The computing device of claim 12, wherein the first application and the second application are of different types.

16. The computing device of claim 12, wherein the notification component executes with elevated execution privileges of an operating system.

17. The computing device of claim 12, wherein the instructions when executed by the one or more computer processors cause the one or more computer processors to:
receive an indication of user input that selects the bundle notification graphical element;
determine a canonical application associated with the bundle notification graphical element; and
output for display the canonical application.

18. The computing device of claim 17, wherein the canonical application is an application that has generated a fewest number of instances of notification data among a set of applications, wherein each of the set of applications has generated content represented by the bundle notification graphical element.

19. The computing device of claim 12, wherein the first notification data has the relationship to at least the portion of content from the second notification data based at least in part on the first notification data originating from a same sender as the second notification data.

20. A non-transitory computer-readable storage medium encoded with instructions that, when executed, cause at least one processor of a computing device to:
receive, at a notification component that manages notifications at the computing device, first notification data from a first application of the computing device and second notification data from a second application of the computing device;
generate, based at least in part on comparing the first notification data to the second notification data, an affinity score that indicates whether content from the first notification data has a relationship to at least a portion of content from the second notification data;
responsive to determining that the affinity score satisfies a threshold, generate a bundle notification graphical element that includes at least a portion of the content from the first notification data, the bundle notification graphical element further being accompanied by a graphical indicator that indicates the content from the first notification data is related to at least the portion of the content from the second notification data; and output, for display, a set of notification graphical elements comprising the bundle notification graphical element accompanied by the graphical indicator, and the set of notification graphical elements comprising at least one other singular notification graphical element that represents a third, single instance of notification data.

21. The non-transitory computer-readable storage medium of claim 20 encoded with instructions that, when executed, cause the at least one processor of the computing device to:

extract the content from the first notification data and the content from the second notification data;

generate a first set of n-grams based on the content from the first notification data and generate a second set of n-grams based on the content from the second notification data; and wherein the instructions that, when executed, cause the at least one processor of the computing device to generate the affinity score further comprise instructions that, when executed, cause the at least one processor of the computing device to generate the affinity score based at least in part on the first set of n-grams and the second set of n-grams.

* * * * *

UNITED STATES PATENT AND TRADEMARK OFFICE
CERTIFICATE OF CORRECTION

| | | |
|---|---|---|
| PATENT NO. | : 9,756,005 B2 | Page 1 of 1 |
| APPLICATION NO. | : 14/932915 | |
| DATED | : September 5, 2017 | |
| INVENTOR(S) | : Matthew Sharifi and Jakob Nicolaus Foerster | |

It is certified that error appears in the above-identified patent and that said Letters Patent is hereby corrected as shown below:

In the Claims

Column 33, Line 67 (Claim 13): Replace "content from the from the second notification data;" with --content from the second notification data;--

Signed and Sealed this
Sixteenth Day of October, 2018

Andrei Iancu
*Director of the United States Patent and Trademark Office*